United States Patent [19]

Hatakeyama

[11] Patent Number: 5,739,760
[45] Date of Patent: Apr. 14, 1998

[54] METHOD AND SYSTEM FOR REMOTE SUPERVISORY CONTROL

[75] Inventor: Satomi Hatakeyama, Kawasaki, Japan

[73] Assignee: Fujitsu Limited, Kanagawa, Japan

[21] Appl. No.: 554,040

[22] Filed: Nov. 6, 1995

[30] Foreign Application Priority Data

Feb. 8, 1995 [JP] Japan ................... 7-020455

[51] Int. Cl.$^6$ .............. G05B 23/02; H04Q 5/00; H04Q 1/00
[52] U.S. Cl. ............... 340/825.15; 340/825.02; 340/825.03; 340/825.06; 340/825.2; 364/132; 379/165
[58] Field of Search .............. 340/825.15, 825.06, 340/825.07, 825.02, 825.2, 825.52, 825.03, 825.17, 506, 870.02; 379/106, 165; 364/132; 395/290

[56] References Cited

U.S. PATENT DOCUMENTS

| | | | |
|---|---|---|---|
| 3,702,460 | 11/1972 | Blose | 340/150 |
| 4,112,416 | 9/1978 | Hasegawa et al. | 340/147 R |
| 4,135,149 | 1/1979 | Takahashi et al. | 340/147 R |
| 4,748,654 | 5/1988 | Gray | 379/40 |
| 4,860,001 | 8/1989 | Yamanaka et al. | 340/825.2 |
| 5,008,662 | 4/1991 | Tokizane et al. | 340/825.06 |
| 5,049,872 | 9/1991 | Yamanaka et al. | 340/825.05 |
| 5,117,421 | 5/1992 | Tokizane et al. | 370/85.1 |
| 5,200,987 | 4/1993 | Gray | 379/40 |
| 5,307,058 | 4/1994 | Tokizane et al. | 340/825.07 |

FOREIGN PATENT DOCUMENTS

| | | |
|---|---|---|
| 3198549 | 8/1991 | Japan. |
| 4336740 | 11/1992 | Japan. |

*Primary Examiner*—Michael Horabik
*Assistant Examiner*—Yonel Beaulieu
*Attorney, Agent, or Firm*—Helfgott & Karas, P.C.

[57] ABSTRACT

A remote supervisory control system is provided in which a master system performs monitoring and control of a plurality of slave systems, maintaining the fine control capability of the past, while enabling implementation with the minimum memory capacity. The master system is connected, via channels, to a plurality of slave systems, each of which has a plurality of individual control points in its purview. The plurality of individual control points are grouped into groups of individual control points having the same attributes, prescribed operations being performed on the status information of all individual control points within each group, the results of these calculations being taken as the status information of a representative control point. This status information is collected in memories located within the master system. The status information of the representative control point can, if necessary, be expanded to the status information of each individual control point and monitored, enabling separate control of the individual control points, and it is also possible to restore to monitoring and control of the original representative control point.

10 Claims, 21 Drawing Sheets

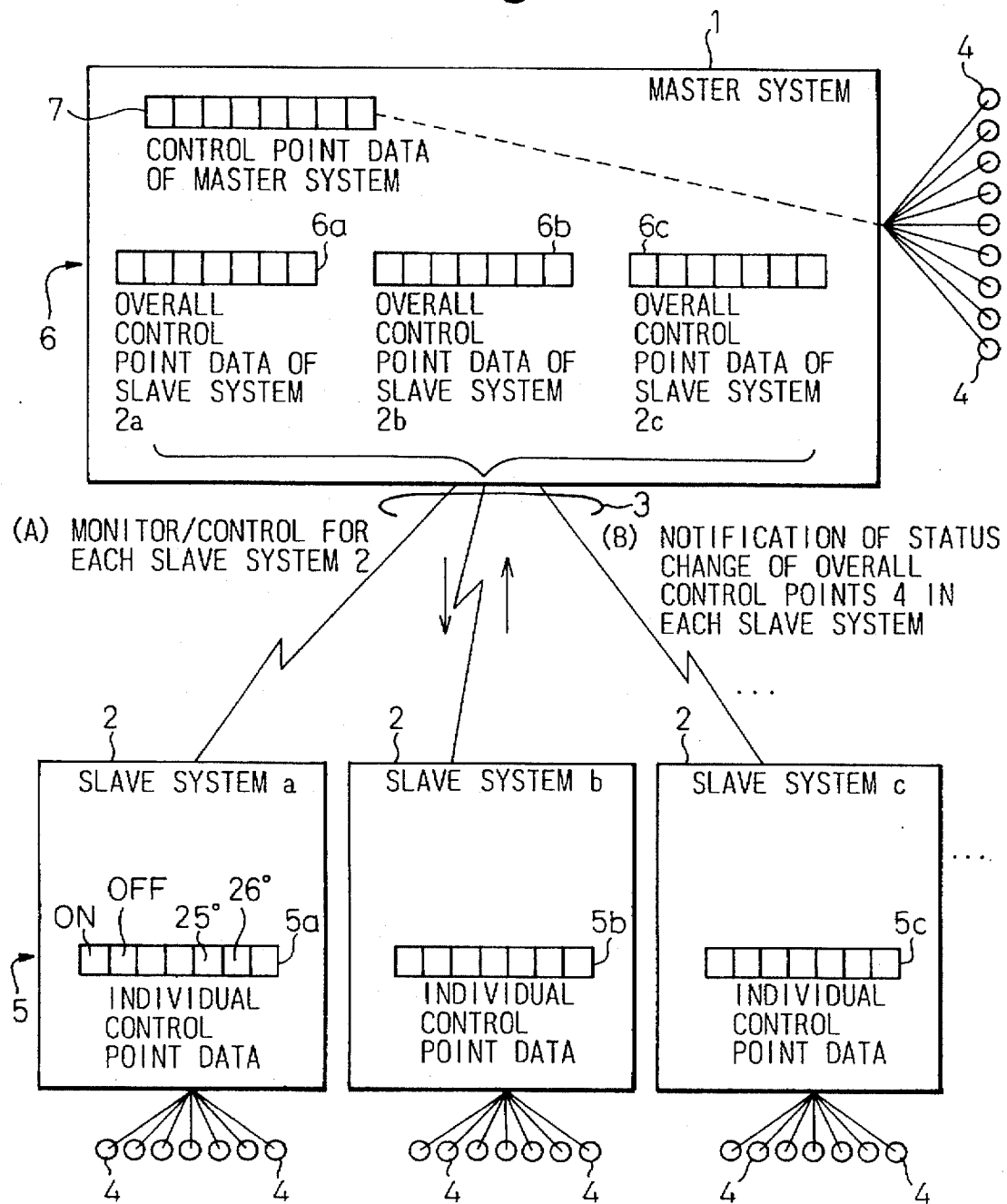

METHOD AND SYSTEM FOR REMOTE SUPERVISORY CONTROL

BACKGROUND OF THE INVENTION

1. Field of the Invention

The present invention relates to method and system for remote supervisory control.

In recent years, large-scale supervisory control systems have been made up of a plurality of monitoring/control systems (hereinafter called slave systems) which are each stand-alone systems, a monitoring/control system (hereinafter called a master system) which performs overall control of this plurality of slave systems, and channels which form links between these slave systems and the master system, this overall system performing what is known as supervisory control.

2. Description of the Related Art

As will described in detail with reference made to the related accompanying drawings, one example of a remote supervisor control system is a building control system. This system, is comprised of a plurality of slave systems and a master system. Each slave system accommodates a plurality of individual control points and monitors the status of each individual control point or applies a control thereto. The master system connects to each of the slave systems via respective channels and performs monitoring of the statutes of the individual control points and overall supervision of the control applied to the individual control points, thereby effecting remote supervisory control from the master system with respect to the slave systems.

In each of the above-noted systems are provided separate first, second, and third status holding memories. The first status holding memory is provided within each of the slave systems, and monitors each of the statuses of the corresponding individual control points.

The master system is notified of the contents of the first status holding memories, which correspond to each of the slave systems, via the above-noted channels. Above-noted second status holding memories are provided within the master system in a one-to-one correspondence with these first status holding memories, the status information which is transferred via the above-noted channels being held in these second status holding memories.

Furthermore, the master system itself has control points of its own, the status information from these control points being held the above-noted third status holding memories for each of individual control points.

In this manner, the master system controls not only its own individual control points, but also, by means of the third status holding memories and second status holding memories, all of the individual control points which are controlled by the plurality of slave systems. Therefore, if the number of slave systems is n, it is necessary to have n second status holding memories as well. In general, because memory is expensive, there was a problem of high cost in systems of the past.

In order to solve this problem, if the number of or the capacity of the memory is merely reduced, it becomes difficult for the master system to apply fine (remote) control, with respect to each of the slave systems, of the individual control points.

SUMMARY OF THE INVENTION

In consideration of the above-described problem with the prior art, an object of the present invention is to provide a method for remote supervisory which is capable of flexibly accommodating an increase in the number of slave systems, without requiring an increase in the scale of the memory in the master system, and a system therefor.

To achieve the above-noted object, the present invention has the following constitution. The master system is connected, via respective channels, to a plurality of slave systems, each of which has a plurality of individual control points in its purview. The plurality of individual control points are grouped into groups of individual control points having the same attributes, the prescribed operations being performed on the status information of all individual control points within each group, the results of these calculations being taken as the status information of a representative control point. This status information is collected in memories located within the master system. The status information of the representative control point can, if necessary, be expanded to the status information of each individual control point and monitored, enabling separate control of the individual control points, and it is also possible to return to monitoring control of the original representative control point. By doing this, it is possible to implement monitoring and control of the individual control points, corresponding to the plurality of slave systems, by the slave system, with the minimum possible memory, while maintaining the same fine control as in the past.

BRIEF DESCRIPTION OF THE DRAWINGS

The present invention will be more clearly understood form the description as set forth below, with reference being made to the accompanying drawings, in which:

FIG. 20 is a drawing which emphasizes the part of the configuration of FIG. 19 which is related to the present invention.

DESCRIPTION OF THE PREFERRED EMBODIMENT

Before describing the embodiments of the present invention, the related art and the disadvantages therein will be described, with reference made to the related drawings.

Figure 19:
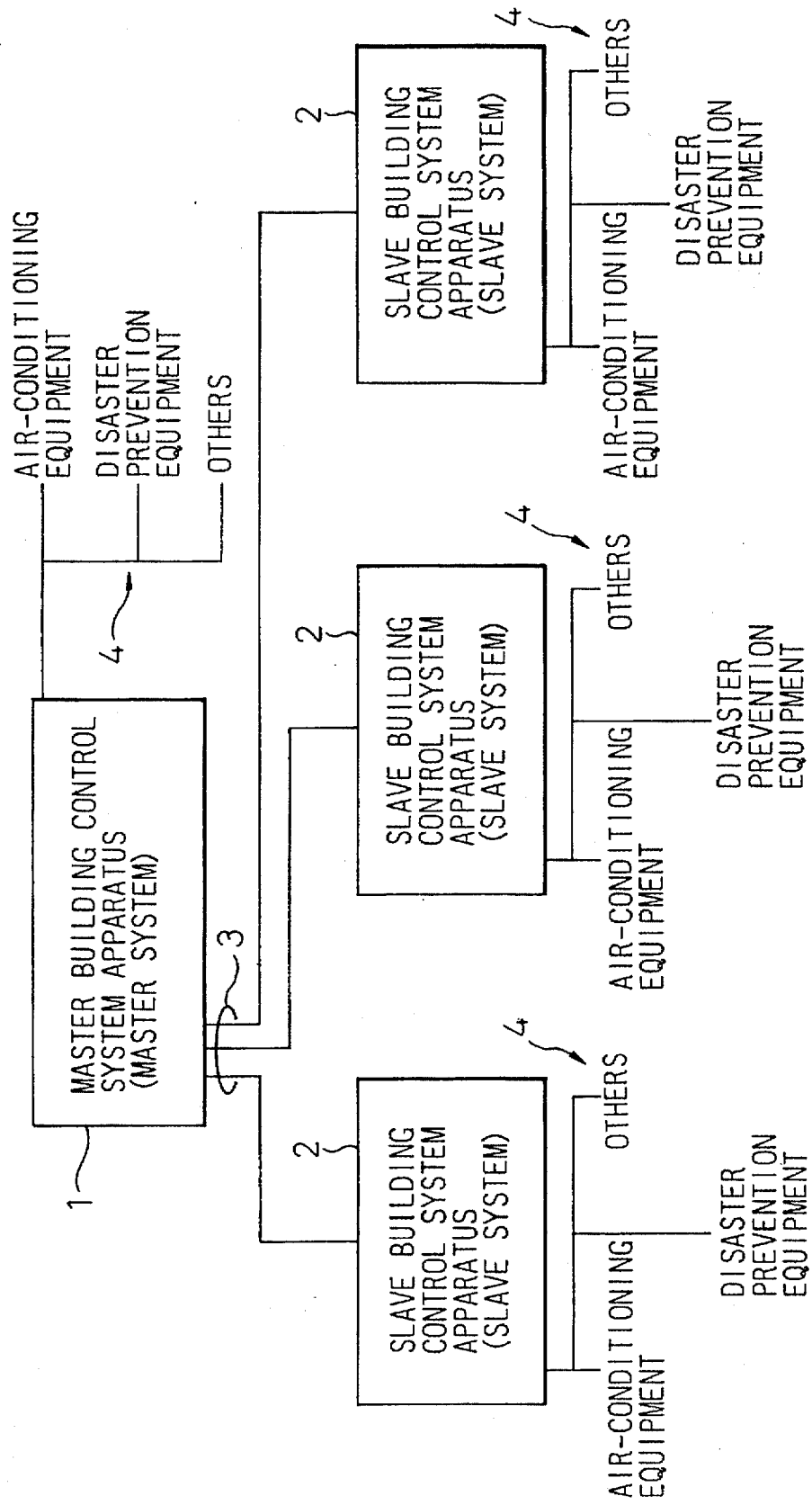
FIG. 19 is a drawing which shows a specific example of a remote supervisory control system.

FIG. 19 shows a specific example of a remote supervisory control system. It shows the example of a large-scale building control system. The overall system is comprised of a plurality of slave systems and a master system. Each slave system 2 accommodates a plurality of individual control points 4 and monitors the status of each individual control point or applies a control thereto. A master system 1 connects to each of the slave systems 2 via channels 3 and performs monitoring of the statutes of the individual control point 4 and overall supervision of the control applied to the individual control points 4, thereby effecting remote supervisory control from the master system 1 with respect to the slave systems 2.

A master building control system equipment group is indicated as the master system 1, and slave building control system equipment groups are indicated as the slave systems 2. So-called "local equipment," such as air-conditioning equipment and disaster prevention equipment, is indicated as the individual control points 4. Other examples include security equipment for the purpose of safety.

The channels 3 can be Public networks or dedicated private lines.

More specifically, each of the building control system equipment groups 1 and 2 are formed by a plurality of minicomputers, personal computers, or dedicated processors. Each of the slave systems 2 is not only monitored and controlled from the master system 1, but can be operated in stand-alone manner.

The individual control points 4, for example in the case of air-conditioning equipment, include not only sensors for temperature and humidity, but controllers for air-conditioning. The sensors are provided for monitoring by the master system 1, and the controllers are provided for control from the master system 1.

FIG. 20 is a drawing in which the parts of FIG. 19 that are related to the present invention are emphasized. That is, the status holding memories 5, 6, and 7, which are provided within each system, are emphasized. These memories are provided respectively (5a, 5b, 5c, and so forth) within each of the slave systems 2 (a, b, c, and so forth), and provide monitoring of each of the statuses with a one-to-one correspondence to the individual control points 4. Therefore, in each of the status holding memories 5, is held, for example, individual control point data such as the on/off status information for lighting equipment 4, or the temperature status information (25°, 26°, and so forth) of the air-conditioning equipment 4.

The contents of the status holding memories 5a, 5b, 5c, and so forth, which correspond to each slave system 2, are transferred to the master system 1 via the channels 3. Inside the master system 1, status holding memories 6a, 6b, 6c, and so forth are provided, which correspond to these status holding memories 5a, 5b, 5c, and so forth, the status information which is transferred via the above-noted channels 3 being held in these memories 6a, 6b, 6c, and so forth.

Furthermore, the master system 1 itself has individual control points 4 in its own purview, the status information from these being held in status holding memories 7, separately for each individual control point 4.

The writing of status information into each of the status holding memories 5 can be performed periodically, or can also be performed when a change in the status occurs, the latter method being desirable from the standpoint of efficient use of the channels.

As is clear from FIG. 20, the master system 1 controls not only its own individual control points 4, but also, by means of memories 7 and 6 (6a, 6b, 6c and set forth), all of the individual control points 4 which are controlled by the plurality of slave systems 2. Therefore, if the number of slave systems 2 is n, it is necessary to have n memories 6 (6a, 6b, 6c, . . . 6n) as well. As mentioned previously, in general, because memory is expensive, there was a problem of high cost in systems of the past.

As described previously, in order to solve this problem, if the number of or the capacity of the memory is merely reduced, it becomes difficult for the master system 1 to apply fine (remote) control, with respect to each of the slave systems 2, of the individual control points 4.

In consideration of the above-described problem, the present invention provides a method for remote supervisory which is capable of flexibly accommodating an increase in the number of slave systems, without requiring an increase in the scale of the memory in the master system, and a system therefor.

For the purpose of solving the above-noted problem, the present invention has a variety of forms, as described below.

Figure 1:
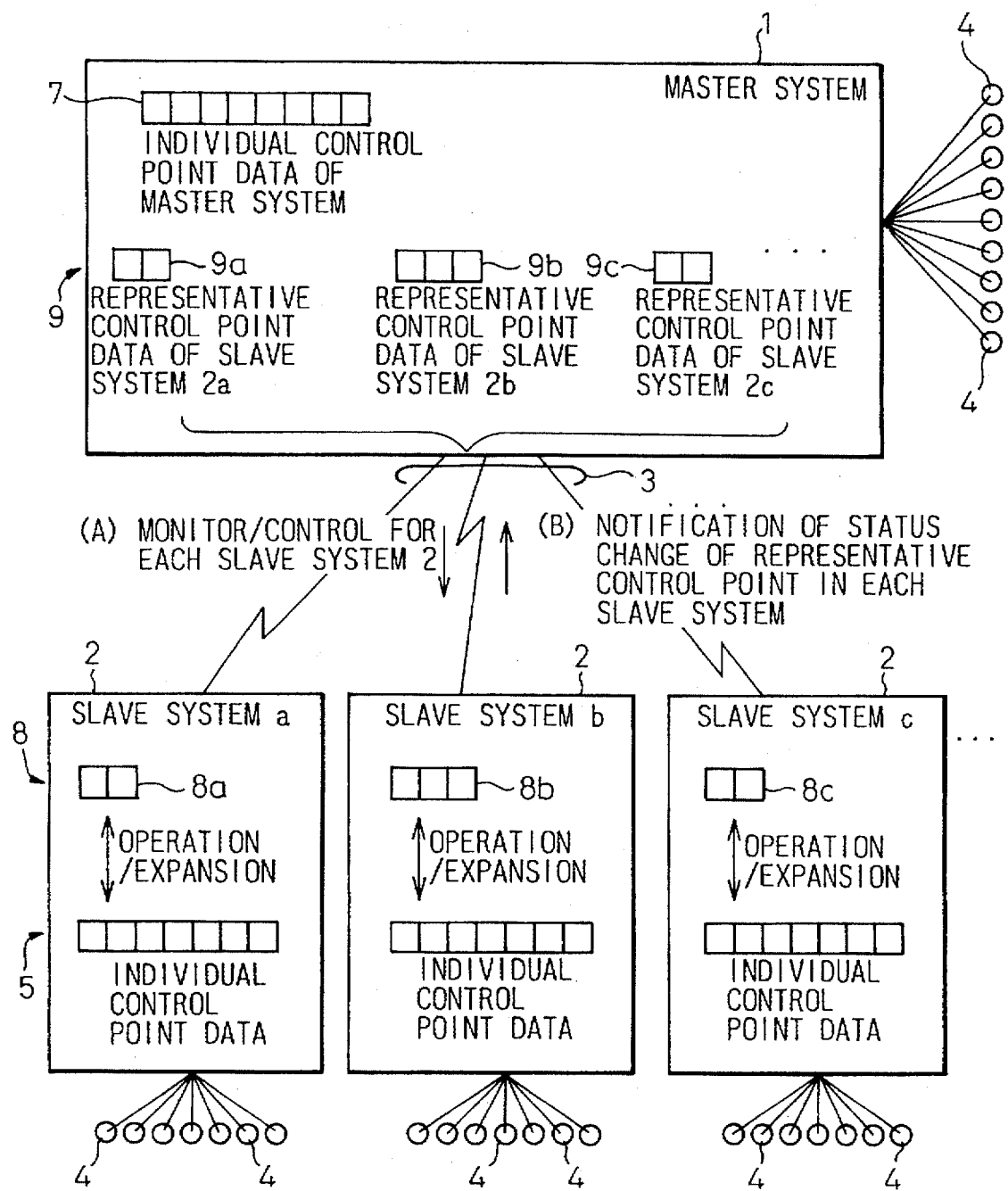
FIG. 1 is a drawing which shows an example of the configuration of the present invention, in comparison with that shown in FIG. 20.

FIG. 1 is a drawing which shows an example of the configuration of the present invention in comparison with that of FIG. 20. A major difference between this and FIG. 20 is the adoption of a representative control point status holding memory 8 at the slave systems 2, and the adoption in the master system 1 of a similar representative control point status holding memory 9. According to the example shown in this drawing, representative control point status holding memories 8a, 8b, 8c, and so forth are provided in the slave system 2a, 2b, 2c, and so forth, and representative control point status holding memories 9a, 9b, 9c, and so forth, which correspond to these memories 8a, 8b, 8c, and so forth are provided in the respective slave systems 2. Data communication between the memories 8a, 8b, 8c, and so forth of the slave systems 2 and the memories 9a, 9b, 9c, and so forth of the master system 1 is performed by means of public lines or dedicated private lines.

The "operation/expansion" indicated within each of the slave systems 2 refers to operations which become necessary by the adoption of the representative control point status holding memory 9. Specifically, the "operation" refers to an operation which is performed with respect to prescribed plurality of individual control points 4, the results of this operation being taken as the representative control point data. In each of the slave systems 2, when data (for example, control data for the individual control points 4) is transferred from the representative control point status holding memory 8 to the status holding memory 5, the representative values, which represent a plurality of individual control points 4, must be restored to the original individual values for each individual control point, and therefore the operation to achieve this is called "expansion."

The huge amount of memory 6 that would be required in a previous system as shown in FIG. 20 (in one example several tens of thousands) is reduced to an extremely small scale memory 9, as shown in the configuration of FIG. 1.

Figure 2:
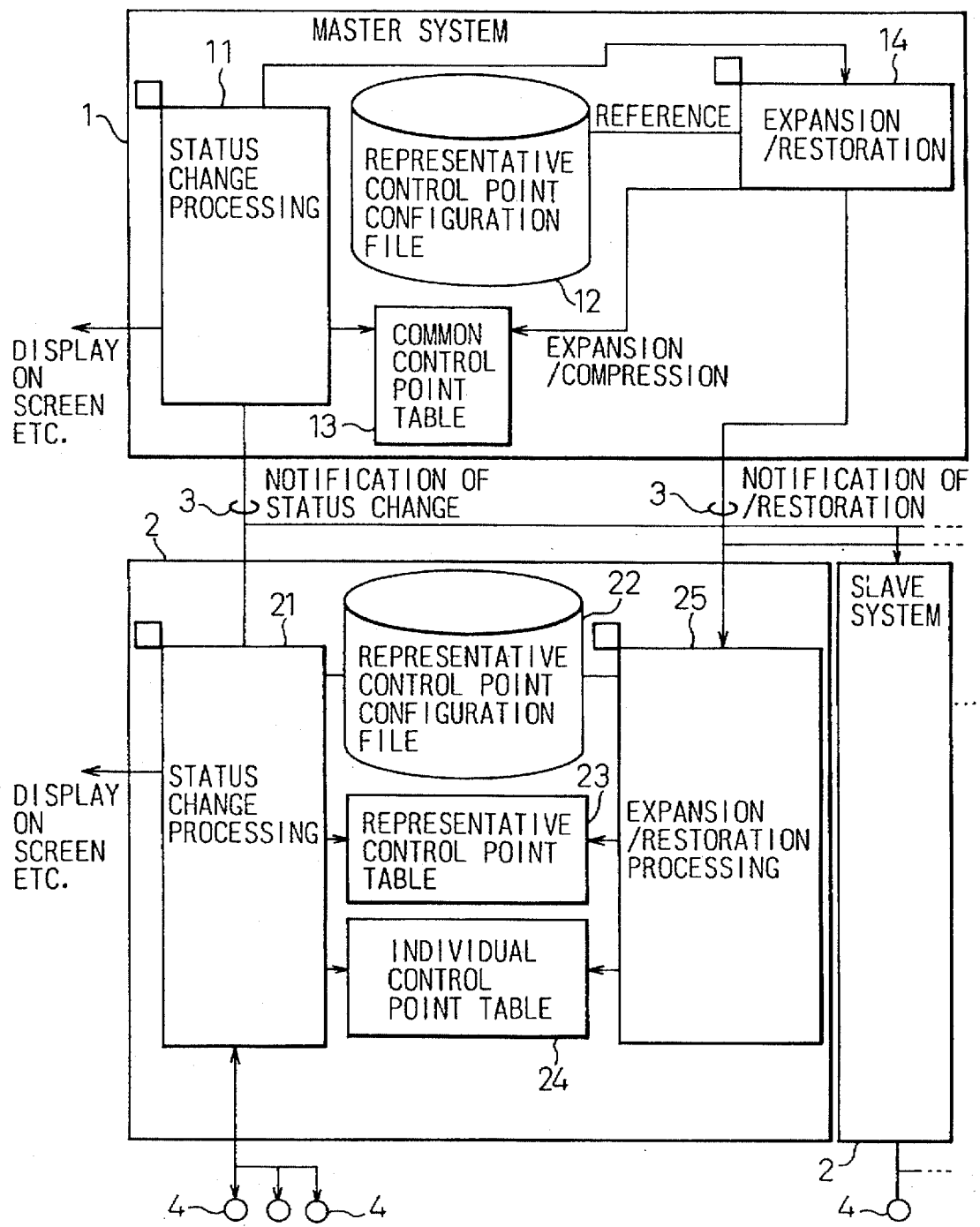
FIG. 2 is a drawing which shows the conceptual configuration of the present invention.

FIG. 2 is a drawing which shows the conceptual configuration of the present invention. In this drawing, looking first at the master system 1, as shown in the drawing, this master system 1 comprises a master system status change processing means 11, a master system side representative control point configuration file 12, a memory means (later to be referred to as a common control point table) 13, and an expansion/restoration processing means 14. In greater detail, the configuration is as follows.

The common control point table 13, in addition to holding statuses which represent each of the statuses of the plurality of individual control points 4 which are grouped into groups having the same attributes, it holds information with regard to the status of particular individual control points 4, which is collected from the individual control points.

The master system side representative control point configuration file 12 has stored in it minimally the correspondence relationship between the representative control point and the individual control points which belong to it, and the address information which specifies the dynamically expanded or compressed area of the common control point table 13.

The master-side expansion/restoration processing means 14 works in concert with the common control point table 13 and the master-side representative control point file 12 to either expand the processing of the above-noted representative control point to individual control points 4, or to restore the processing of these individual control points to processing of a representative control point.

The master-side status change processing means 11 overwrites the previous status in the common control point table 13 each time its status changes, and when either the processing of the above-noted representative control point is expanded to individual control points 4, or the processing of these individual control points is restored to processing of a representative control point, it references the master-side representative control point configuration file 12 and overwrites the above-noted status.

Next, turning to the slave system 2, as shown in the drawing, this slave system 2 comprises a slave-side status change processing means 21, a slave-side representative point configuration file 22, a representative control point table 23, an individual control point table 24, and a slave-side expansion/restoration processing means 25. In greater detail, the configuration is as follows.

The individual control point table 24 holds information with regard to the statuses of the individual control points 4, which is collected from the individual control points 4 in its purview.

The representative control point table 23 holds the statuses which represent each of the statuses of a pluralities of individual control points 4 which are grouped as having the same attributes.

When there is a change in the status of individual control points, the slave-side status change processing means 21 provides to the individual control point table 24, as is, information with regard to the statuses of each of the individual control points 4, which is collected from each of the individual control points 4 in its purview, but provides status information with regard to the plurality of individual control points 4 to the representative control point table 23 after performing the prescribed operation on it.

The slave-side representative point configuration file 22 minimally holds the relationship between the representative control point and the individual control points 4 which belong to it, and the equation which defines the above-noted operation.

The slave-side expansion/restoration processing means 25 works in concert with the individual control point table 24, the representative control point table 23, and the slave-side representative point configuration file 22, to either expand the processing of the above-noted representative control point to individual control points 4, or to restore the processing of these individual control points to processing of a representative control point.

In the first aspect of the present invention, remote supervisory control is executed by the following described steps (i), (ii), and (iii).

(i) Each of the slave systems 2 separates beforehand the plurality of individual control points 4 into a number of groups having the same attributes.

(ii) Pre-established calculation is performed on each of the statuses of the plurality of individual control points 4 which have been grouped beforehand, the results of this processing being taken as the statuses of the representative control points which represent each of these groups.

(iii) The master system 1 is notified of the above-noted representative control points, so that overall monitoring of the individual control points is performed at the master system 1.

In this processing, groups having the same attributes are, to cite some examples, a group of a plurality of individual control points 4 related to illumination equipment, a group of individual control points 4 related to air-conditioning equipment, or a group of a plurality of individual control points 4 related to security equipment. The above-noted status, for example, with regard to the above-noted group of individual control points 4 related to illumination equipment, is the on/off (lighted/extinguished) status. For a group of individual control points related to the above-noted air-conditioning equipment, it could be the temperature status (°C.).

The performance of pre-established operations on the above-noted status refers to taking the AND (logical product), the OR (logical sum), or the average value thereof. For example, with regard to a group consisting of a plurality of individual control points related to security (for example, locks), if an alarm is issued which indicates that even one of these is open, the master system 1 must be notified of this immediately. Therefore, the OR of these individual control points 4 must be used as the above-noted representative control point. In the case of a group consisting of a plurality of individual control point 4 related to air-conditioning, if the master system 1 is to be notified when there is variation in the temperature even over a given floor of a building, it would appropriate to take the average of the data from all the temperature sensors. That is, it is desirable to take the average value as the above-noted representative control point data with regard to the individual control points which are temperature sensors.

With regard to illumination equipment, if it is desired to make a normal/abnormal check of illumination lamps, it is necessary to notify the master system 1 with normal information when all of the illumination lamps are normal.

Therefore, the above-noted AND is taken as the representative control point data.

In accordance with the second form of the present invention, notification is made from the slave system 2 of not only the representative control point status, but also the statuses of pre-established individual control points. With regard to these statuses, of which notification is given, monitoring is done at the master system 1, regardless of whether the status is related to a representative control point or related to an individual control point.

In accordance with the third form of the present invention, when notification is given from the master system 1 of control with respect to representative control points belonging to a slave system 2, the slave system 2 restores the corresponding representative control point information to group information, expanding the above-noted group to all the individual control points 4 which make up the group, and applying control to each of the individual control points 4 which are expanded.

In accordance with the fourth form of the present invention, when the master system i performs control with respect to the above-noted representative control point and also when it performs control with respect to individual control points 4, control is performed regardless of whether it is related to a representative control point or to individual control points 4.

In accordance with the fifth form of the present invention, part of the information used in monitoring and control of representative control points and individual control points 4, of which notification is made from the master system 1 to the slave system 2, has added to it a flag which indicates whether the monitoring and control is to be performed with respect to a representative control point or with respect to individual control points 4. In only the case in which the flag is set which indicates a change to monitoring and control of individual control points, the master system 1 expands the common control point table (memory means) 13 within it, the statuses of each expanded individual control point making up the above-noted representative control point being collected in the expanded storage area.

In accordance with the sixth form of the present invention, part of the information used in monitoring and control of representative control points and individual control points 4, of which notification is made from the slave system 2 to the master system 1, has added to it a flag which indicates whether the monitoring and control is to be performed with respect to a representative control point or with respect to individual control points 4. When the flag which indicates a change to monitoring and control of individual control points is set, the slave system 2 notifies the master system 1 of the statuses of the expanded individual control points which make up the above-noted representative control point.

In accordance with the seventh form of the present invention, when flag which indicates a change to monitoring and control of a representative control point is set, the expanded common control point table (memory means) 13 within the master system 1 is compressed, and monitoring and control is once again performed of representative control points.

In accordance with the eighth form of the present invention, when a flag which indicates a change to monitoring and control of representative control points is set, return is made within the slave system 2 to monitoring and control of representative control points.

In accordance with the ninth form of the present invention, whenever there is a change in the status of the information related to the statuses of each individual control point, which is collected from the individual control points 4 in the purview of each slave system 2 and held in the individual control point table 24, or the status which represents each of the statuses of pluralities of individual control points which are grouped together as having the same attributes, which is held in the representative control point table 23, this is provided to the individual control point table 24 as is. However, with respect to the representative control point table 23, after performing a pre-established operation with regard to each of the statuses of the pluralities of individual control points 4, the slave-side status change processing means 21 which provides this, the status information representative point configuration file 22, into which minimally are stored the relationship between the representative control point and the individual control points that belong thereto and an equation which defines the above-noted operation, the individual control point table 24, the representative control point table 23, and the slave-side representative point configuration file 22 work in concert, a slave-side expansion/restoration processing means 25 being provided, which expands the processing of representative control points to individual control points 4, and restores this processing with respect to the individual control points 4 to processing of a representative control point.

In accordance with the tenth form of the present invention, the configuration is provided with a common control point table 13 which holds in common information related to the status which represents the individual statuses of a plurality of individual control points 4 which are grouped as having the same attribute and information related to statuses which are collected from individual control points 4, a master-side representative control point configuration table 12 into which is minimally stored the relationship between the relationship between the representative control point and address information which specifies a dynamically expanded or compressed storage region of the common control point table 13, a master-side expansion/restoration processing means 14 which works in concert with the common control point table 13 and the master-side representative point configuration file 12 to expand processing of representative control points to processing of individual control points 4 and to restore expanded individual control points once again to processing of a representative control point, and a master-side status change processing means 11 which executes an overwriting of the status in the common control point table 13 when each status change occurs, and which also, when processing of representative control points is expanded to processing of individual control points 4 and expanded individual control points once again are restored to processing of a representative control point, references the master-side representative point configuration file 12 and performs overwriting.

In accordance with the first form of the present invention as described above, the need for the master system to collect the data from all the individual control points 4 which are in the purviews of all the slave systems 2 is eliminated.

In accordance with the second form of the present invention as described above, for an individual control point which cannot be grouped as a representative control point, notification of its status information is given from the slave-side system 2 to the master system 1. In this case, at the master system 1, no distinction is made between the storage area for status information from grouped individual control points and the status information from non-grouped individual control points. By doing this, flexible use is enabled with the minimum of storage area.

In accordance with the third form of the present invention as described above, when there is control with respect to a slave system side (2) representative control point from the master system 1, the controlled representative control point is expanded into individual control points and individual control is performed.

In accordance with the fourth form of the present invention as described above, the master system performs control in common for both representative control points and individual control points. By doing this, there is no need to have an increase in storage area within the master system.

In accordance with the fifth form of the present invention as described above, in response to which flag is set, the slave system 2 can make an automatic determination of whether monitoring and control is to be performed with respect to a representative control point or with respect to individual control points which are expanded from the representative control point.

When the flag which indicates that monitoring and control is to be performed with respect to a representative control point is cleared (that is, when execution is to be made of monitoring and control with respect to individual control points), at this time only the storage area in the memory means which stores the status information from the slave side is temporarily expanded.

In accordance with the sixth form of the present invention as described above, in response to the status of the above-noted flag, at the slave system side (2), the representative control point condition or the condition in which the representative control point is expanded into individual control points is automatically selected and notification given to the master system 1.

In accordance with the seventh form of the present invention as described above, when the related flag is reset, the temporarily expanded storage area within the master system 1 is compressed, the purpose being to constantly maintain the memory means 13 at the minimum storage area.

In accordance with the eighth form of the present invention as described above, at the slave system 2 as well, in response to the above-noted flag, the temporary monitoring and control of individual control points is returned to the original condition, that is, to the mode in which monitoring and control is performed of a representative control point.

In accordance with the ninth form of the present invention as described above, a specific hardware configuration is provided for the slave system for the purpose of embodying the above-described remote supervisory control method according to the present invention.

In accordance with the tenth form of the present invention as described above, a specific hardware configuration is provided for the master system for the purpose of embodying the above-described remote supervisory control method according to the present invention.

Figure 3:
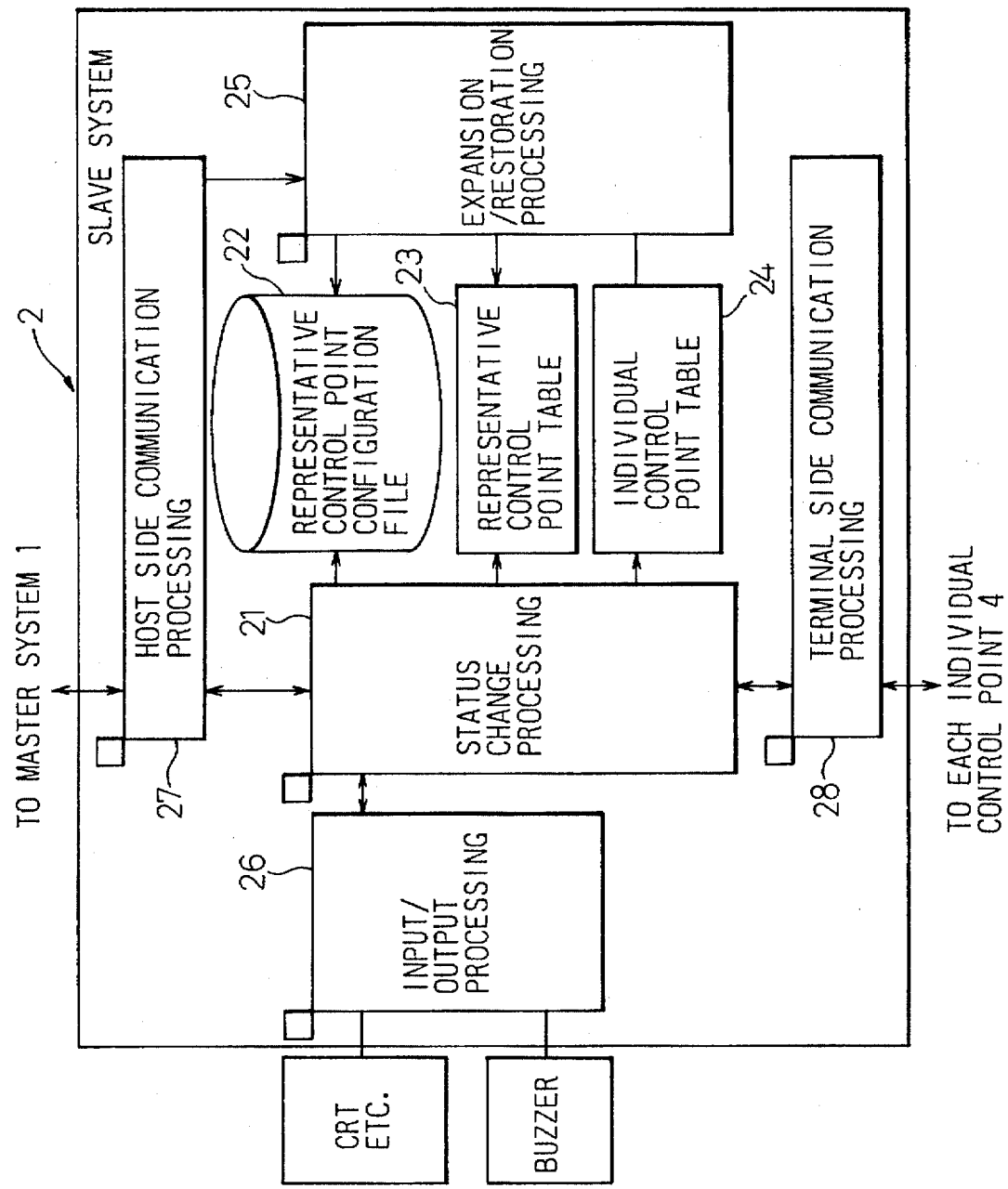
FIG. 3 is a drawing which shows an embodiment of a slave system.
Figure 4:
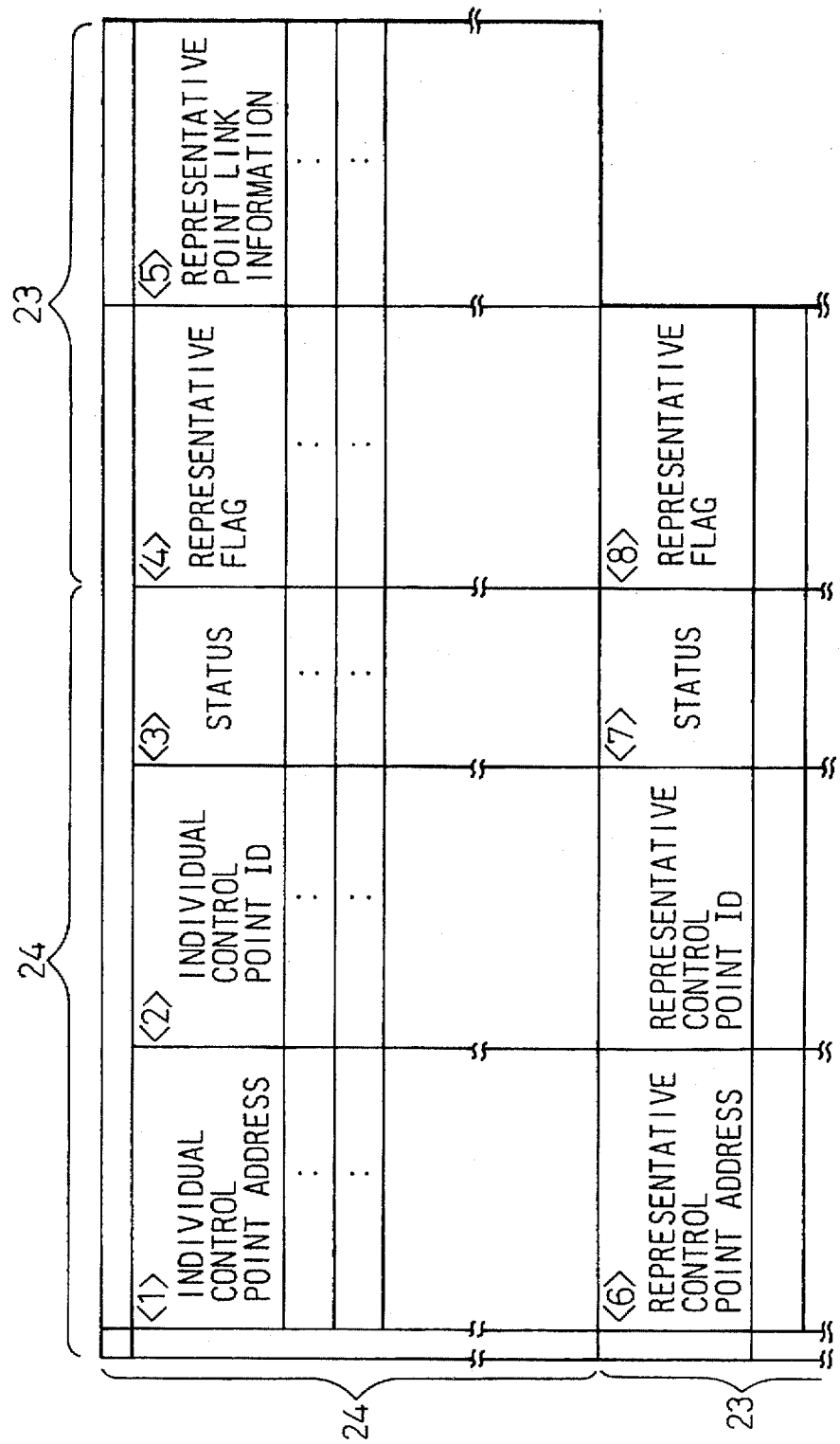
FIG. 4 is a drawing which shows an example of the representative control point table 23 and individual control point table 24 shown in FIG. 3.
Figure 5:
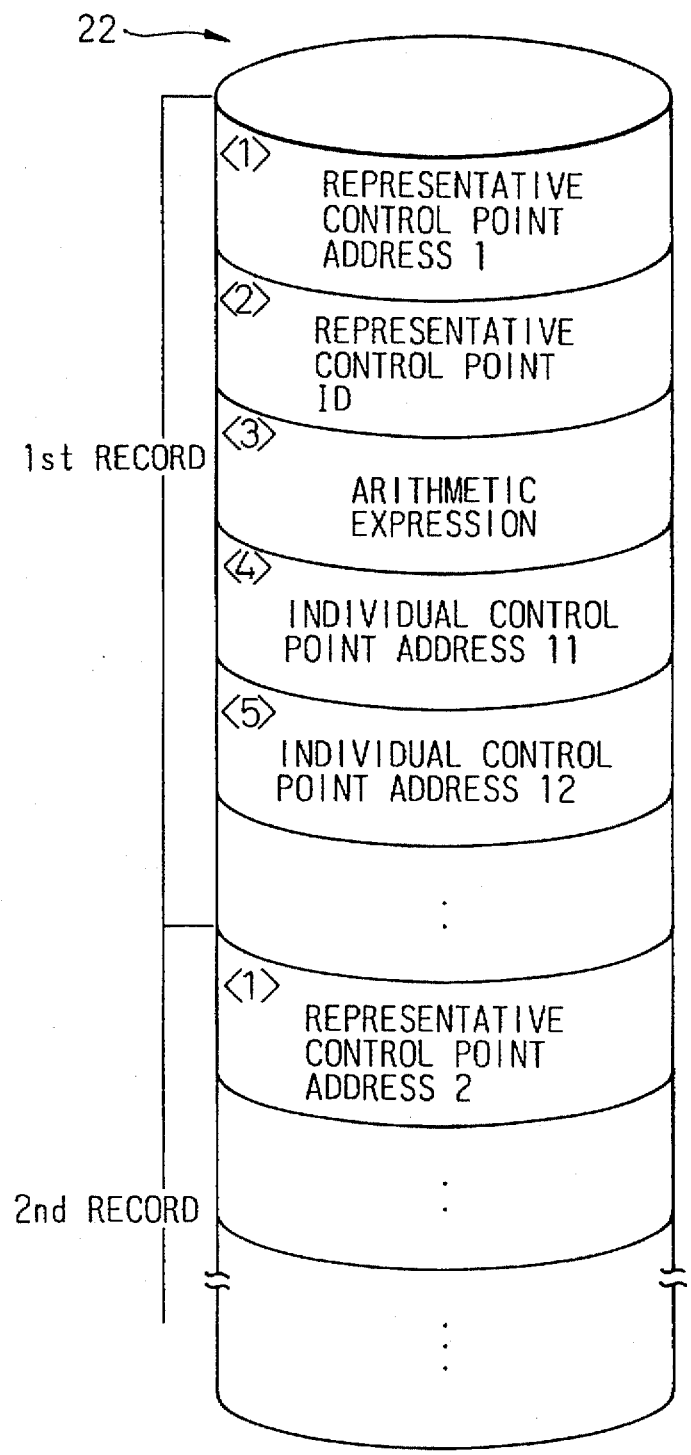
FIG. 5 is a drawing which shows an example of the representative point configuration file 22 shown in FIG. 3.

FIG. 3 shows an embodiment of the slave system, FIG. 4 shows an example of the representative control point table 23 and the individual control point table 24 in FIG. 3, and FIG. 5 shows an example of the representative point configuration file 22 in FIG. 3. With the configuration shown in FIG. 3, in comparison with the configuration of the slave system 2 shown in FIG. 2, there are added a slave-side input/output processing means 26, a host-side communication processing means 27, and a terminal-side communication processing means 28, making the configuration more specific.

The terminal-side communications processing means 28 at the slave side performs communication processing for each of the individual control points 4. At each of these individual control points 4, when a change in status, such as the above-noted on/off change or temperature change (such as 25° or 26°) occurs, this change in status is collected within the slave system 2 via the terminal-side communication processing means 28. This collection operation is performed by notifying the status change processing means 21 of the above-noted change in status. The terminal-side communication processing means 28 receives this via the status change processing means 21, and transfers the control request with respect to each individual control point 4 to each related individual control point 4, thereby controlling the corresponding individual control points.

When the slave-side input/output processing means 26 receives a notification of the status change from the individual control point 4 via the status change processing means 21, this is transferred to the illustrated CRT, or to a buzzer, the updating of the status being displayed on the screen of the CRT or the like and a buzzer being sounded, thereby notifying the operator that a change in status has occurred at the individual control point 4.

The operator can request control with respect to a desired individual control point 4, via a keyboard or the like, and in this case the request is transferred to the corresponding individual control point 4 via the terminal-side communication processing means 28.

The host-side communication processing means 27 performs processing of communication with the master system 1. Specifically, notification of the status change at the individual control point 4 which was obtained via the slave-side status change processing means 21 is made to the master system 1. In the reverse direction, a request for control with respect to an individual control point 4 is received from the master system 1, and this control request is transferred to the status change processing means 21. When there is a request for expansion from a representative control point to individual control points, or a restoration request from the master system side, this request is transferred to the status change processing means 21.

When the slave-side status change processing means 21 receives notification, via the terminal-side communication processing means 28 at the slave side, of a status change which has occurred at an individual control point 4, the received status change is transferred to the above-noted input/output processing means 26.

This status change processing means 21 overwrites the current status stored in the individual control point table 24, in accordance with the above-noted status change. When doing this, the representative flag F in the tables 23 and 24 shown in FIG. 4 is referenced, these to be described later. The representative flag F indicates whether monitoring and control is to be performed of a representative control point or of an individual control point, and when the flag takes the logic 0 to indicate that monitoring and control is to be performed with respect to an individual control point, the above-noted status change is transferred as is from the status change processing means 21 to the host-side communication processing means 27, without being otherwise processed.

In the reverse, when the flag is "1", thereby indicating the monitoring and control is to be performed with respect to a representative control point, the representative point configuration file 22 is referenced, based on the representative point link information L in the tables 23 and 24 illustrated in FIG. 4. In this file 22 is stored, as illustrated by FIG. 5, an equation for the purpose of calculating data of the representative control point, this equation being used to calculate the various values of the individual control points which make up the representative control point, and the results of these calculations being taken as the representative control point value and written into the representative control point table 23. If these values are different than the immediately previous values, there has been a change in status of this representative control point, and a notification of this status change is made via the host-side communication processing means 27 to the master system 1.

In reverse, if a control request is received from the master system 1 to the slave system 2 side for control with respect to an individual control point 4, the host-side communication processing means 27 transfers this to the status change processing means 21. The status change processing means 21 references the representative point file 22, expands the representative control point to all the individual control points 4 that make it up, and applies the requested control to the corresponding individual control points 4, via the terminal-side communication processing means 28.

This type of request for control of an individual control point 4 can also be given by the operator who manages the slave system, by a keyboard or the like. This control request passes through the input/output processing means 26 as is, and via the terminal-side communication processing means 28, thereby being applied to the relevant individual control point 4.

The slave-side expansion/restoration processing means 25 accepts from the master system 1, via the host-side communication processing means 27, a request to either expand a representative control point or restore (reproduce) the representative control point from the expanded individual control points. In this case, if the request is for expansion into individual control points, the expansion/restoration processing means 25 references the representative point configuration file 22 and identifies the individual control points 4 which make up the representative control point, setting the representative flag F' (shown in FIG. 4) which corresponds to these individual control points 4 to "1". The representative flag F which corresponds to the representative control point is set to "0".

In reverse, if the above-noted request is for restoration, the expansion/restoration means 25 references the representative control point configuration file 22, and identifies the individual control points 4 which make up the representative control point, setting the representative flag F' which corresponds to these individual control points 4 to "0". The representative flag F which corresponds to the representative control point is set to "1".

FIG. 4 will now be described in more detail. In this drawing, the <1> individual control point address has written into it an address which is uniquely assigned to each of the individual control points 4. The <6> representative control point address similarly has written into it an address which is uniquely assigned to each representative control point.

The <2> individual control point ID has written into it an identifier for the purpose of distinguishing whether each of the individual control points 4 is a digital control point or an analog control point. This is because it is advantageous, in performing the above-described operations, to know beforehand whether the operation is a digital operation or an analog operation.

The <3> status has written into it the various status information as described above. For example, this is the above-noted on/off information, measured temperature information, lock alarms or information with regard to the resetting thereof.

The <4> representative flag F' is "0" when the status of each individual control point 4 is to be treated as the status of the representative control point which includes it, and "1" when the individual control point statuses are to be treated separately. Furthermore, the logic of the representative flag F' is the inverse of the logic of the <8> representative flag which is applied to each representative control point.

The <5> representative point link information L indicates the representative point address when representative processing is performed with regard to a plurality of individual control points. This corresponds to the <6> in FIG. 4, and corresponds also to the representative point addresses 1 and 2 in FIG. 5.

In addition in FIG. 4, <7> stores the status information as a representative control point. These statuses <7>, <3> and the representative flags F' and F (<4> and <8>) change dynamically, whereas the contents of other items (<1>, <2>, <5>, and <6>) are fixed.

Next, the representative point configuration file 22 will be described in detail. With respect to a plurality of slave systems 2, if there are n representative control points provided, in each of n representative control points there is allotted a file area for one record, as illustrated. In the drawing, the specific example is that of a representative control point to which is assigned a representative control point address 1, indicated by <1>. The same is true of the other representative control points.

The <2> representative control point ID shown is provided for the writing of an ID for the purpose of distinguishing whether the representative control point is a digital or an analog control point. The significance of providing such an identifier is the same as described for <2> in FIG. 4.

In the arithmetic expression equation <3> shown in this drawing has stored in it an arithmetic expression that specifies what kind of calculation is to be performed on the status information of a plurality of individual control points to obtain the representative control point thereof. For example, it could be the already mentioned AND, OR, or average calculation.

In this drawing, <4> and <5> are locations in which is stored the addresses (same as <1> of FIG. 4) of all individual control points belonging to a representative control point.

Figure 6:
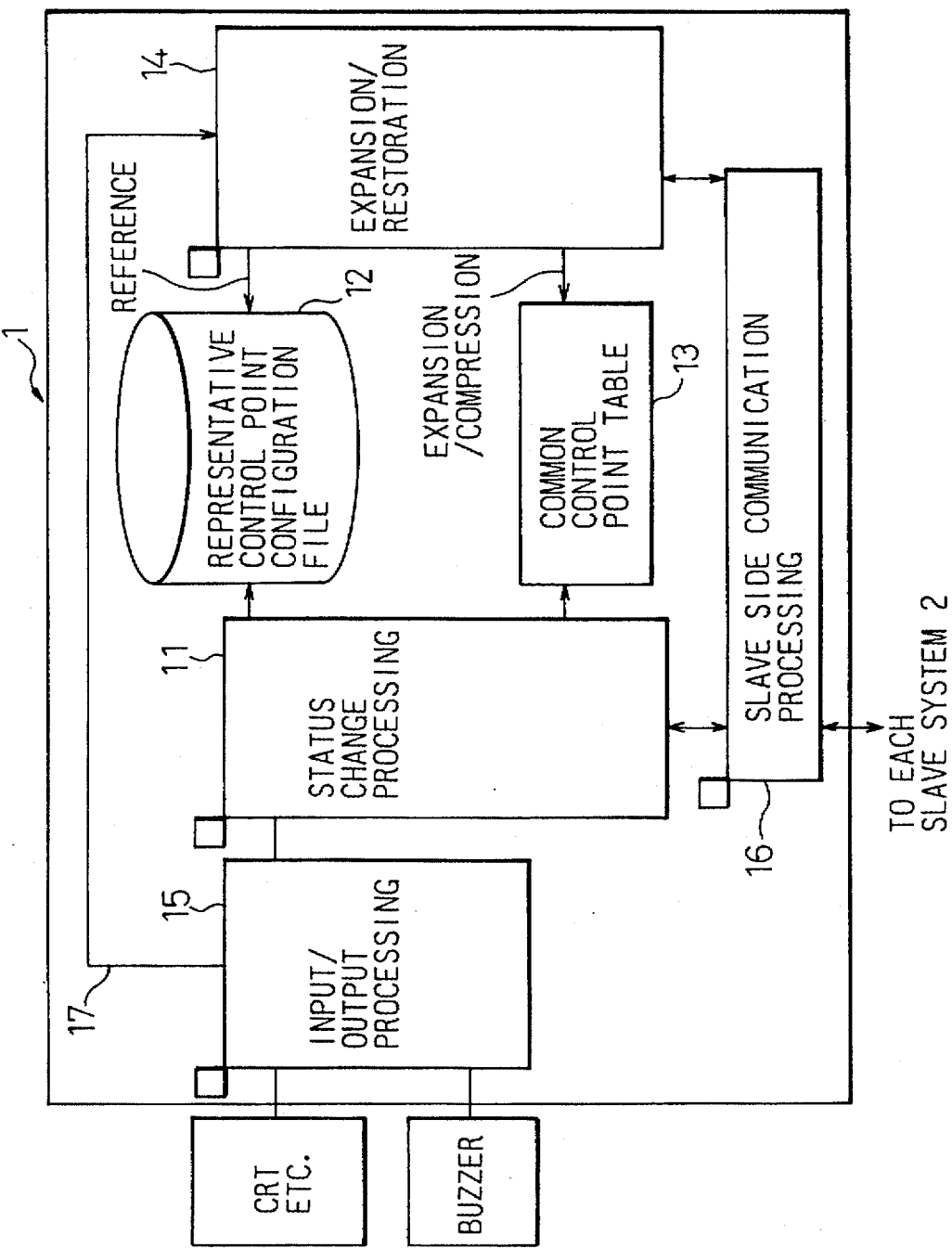
FIG. 6 is a drawing which shows an embodiment of a master system.
Figure 7:
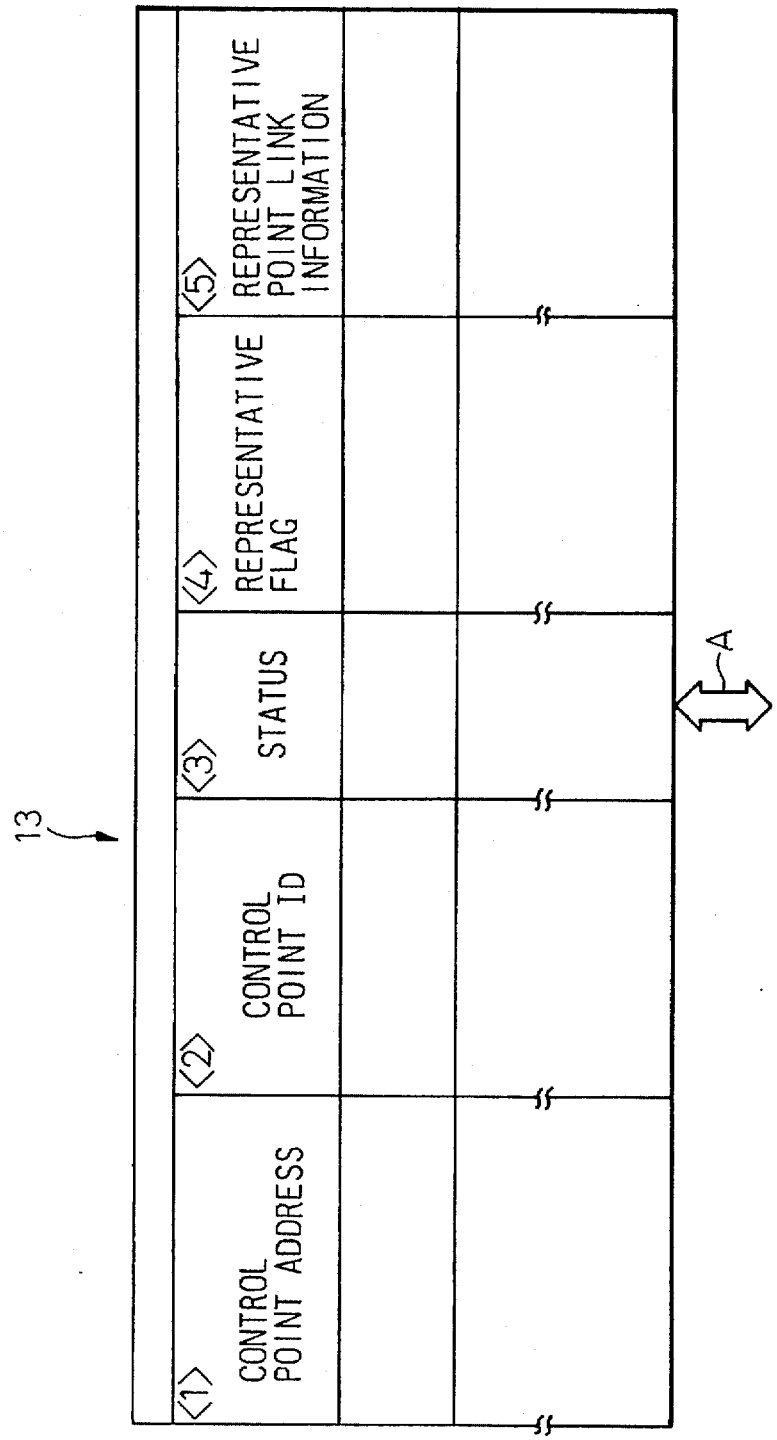
FIG. 7 is a drawing which shows an example of the common control point table 13 shown in FIG. 6.
Figure 8:
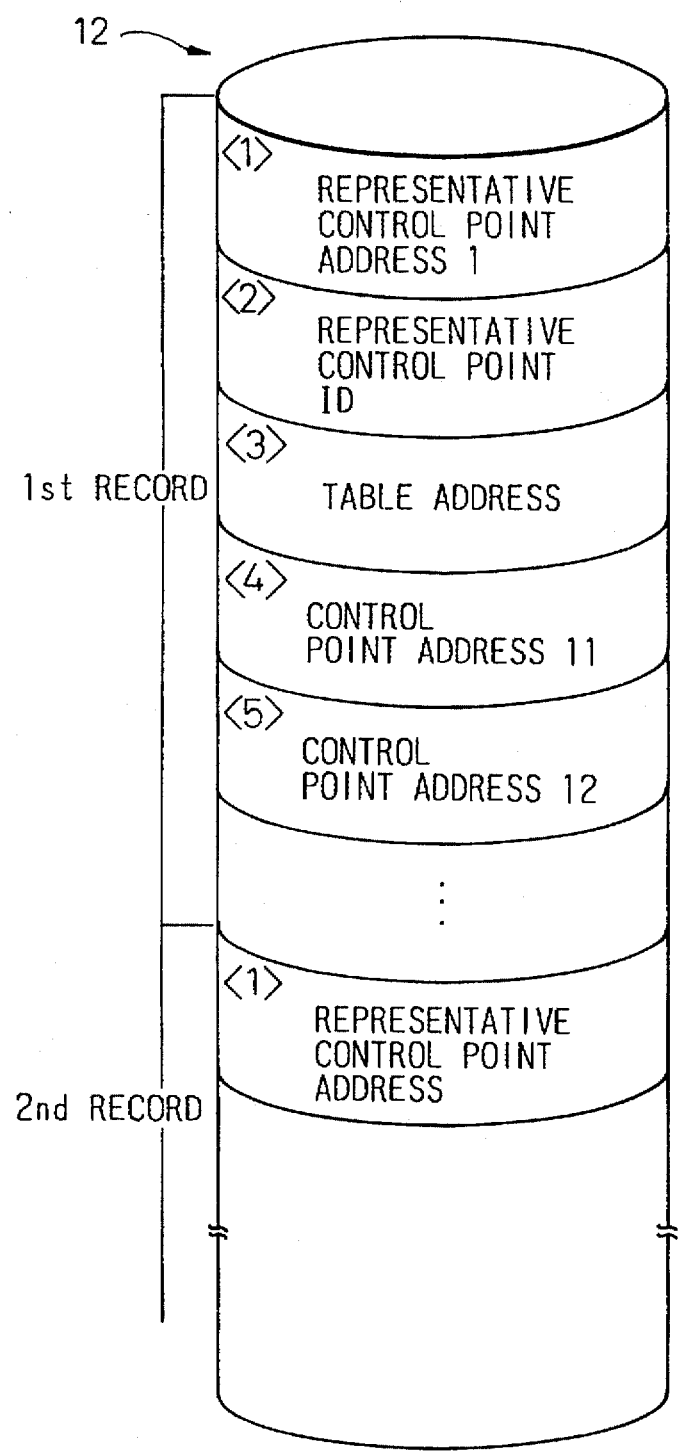
FIG. 8 is a drawing which shows an example of the representative control point configuration file 12 shown in FIG. 6.

FIG. 6 shows an embodiment of the master system, FIG. 7 shows an example of the common control point table 13 shown in FIG. 6, and FIG. 8 shows an example of the representative point configuration file 12 shown in FIG. 6. With the configuration shown in FIG. 6, in contrast to the configuration of the master system 1 shown in FIG. 2, there is the added master-side input/output processing means 15 and slave-side communication processing means 16 at the master system side, making this example more specific.

The terminal-side communication processing means 16 at the master system performs processing of communication with each slave system 2. At these slave systems 2, when status change such as an on/off change or a temperature change (25 °, 26°) or the like occurs, this status change is collected in the master system 1 via the corresponding terminal-side communication processing means 16. This collection operation is performed by notifying the master-side status change processing means 11 of the above-noted change in status. The terminal-side communication processing means 16 receives this via the status change processing means 11, and transfers a control request with respect to each individual control point 4 to the corresponding slave system 2, thereby controlling the corresponding individual control points.

When the master-side input/output processing means 15 receives from the slave system 2, via the status change processing means 11, a notification of a status change, this is transferred to the illustrated CRT or to a buzzer, the updating of the status being displayed on the screen of the CRT or the like and a buzzer being sounded, thereby notifying the operator that a change in status has occurred at the slave system 2.

When this status change processing means 11 receives via the channel 3 a notification of a status change in an individual control point 4 occurring at the slave system 2 side, particularly the status change which would cause a change in the status of the related representative control point, the processing means 11 overwrites the status which is currently stored in the common control point table 13, according to the above-noted status change.

In the present invention, the general approaching to avoiding an increase in the scale of the memory in the master system 1, is to monitor only the representative control point from the slave system 2, and to perform control only for the representative control point in the slave system 2. However, in a case in which a notification is made to the master system 1 of a status change which indicates, for example, that a lock is unlocked late at night, it is necessary for the operator managing the master system 1 to make an emergency determination of what lock is unlocked. In such a case, it is necessary for the input/output processing means 15 to activate the expansion/restoration processing means 14 via the line 17, so that the representative control point which includes the individual control point corresponding to the unlocked lock is expanded.

This expansion is performed by referencing the representative point configuration file 12 which is shown in FIG. 5. In this case, because it is necessary to monitor the statuses of each of the expanded individual control points 4, the storage area of the common control point table 13 shown in FIG. 7 is expanded downward by an amount corresponding to the expanded individual control points 4.

For the example given above, after the monitoring of each of the groups of individual control points 4 related to the above-noted lock that is unlocked is completed, the storage area of the above-noted common control point table 13 is restored (compressed) to its original condition. In this manner, the storage area of the table 13 is used dynamically, without having to distinguish, during the control of the storage, between a representative control point or individual control points. That is, when necessary, the area can be immediately expanded, and when no longer required, the area can be compressed once again. As a result, the memory size used by the table 13 is greatly reduced. Specifically, the expansion or compression along the direction of the arrow A is performed.

Next, a more detailed description of the master-side representative point configuration file 12 will be presented, with reference made to FIG. 7. In this drawing, into the control point address <1> is written an address which is uniquely allotted to each of the representative control points. When the above-noted expansion is performed, the addresses uniquely allotted to the expanded individual control points are also written here.

Into the control point ID <2> is written an ID for the purpose of distinguishing whether the each representative control point or each expanded individual control point 4 is an digital control point or an analog control point.

Into the status <3> is written various status information as described previously. For example, this is the above-noted on/off information, measured temperature data, lock alarms or information with regard to the resetting thereof or the like.

The <4> representative flag indicates that the corresponding control point is a representative control point or an individual control point, it being "1" for representative control point and "0" for individual control point.

The <5> representative point link information L, as described with regard to FIG. 4, indicates the representative control point address when representative processing is performed with regard to a plurality of individual control points. This corresponds to the representative point addresses 1 and 2 in FIG. 8.

The master-side representative point configuration file 12 shown in FIG. 8 is the same as the slave-side representative point configuration file 22 shown in FIG. 5. However, the arithmetic expression (<3>) which is stored in the file 22 of FIG. 5 is not stored in file 12 of FIG. 8. In place of this, a table address <3> is incorporated into the file 12 of FIG. 8. This table address <3> indicates the address of the control point which is allotted anew when the table 13 is expanded along the arrow A of FIG. 7. These newly allotted control point corresponding to these newly allotted control point addresses, the statuses of individual control points and the like (having unique addresses 11 and 12) which are indicated in FIG. 8 by <4>, <5>, and so on, are stored and monitored.

When the expansion/restoration processing means 14 receives from the operator an expansion request via the input/output processing means 15, it references the representative point configuration file 12 (FIG. 8) and identifies the group of individual control points 4 which make up the representative control point to be expanded. When this is done, the representative flag in the common control point table 13 shown in FIG. 7 is set to "0". Then this table 13 is expanded in the direction of the downward arrow A, thereby establishing the storage area for the expanded group individual control points.

By watching the above-described representative flap, it is possible to perform quick switching to representative control point control or individual control point control, not only at the master system 1 side, but also at the slave system side.

The means 21, 25, 26, 27, and 28 which are shown in FIG. 3, the means 11, 14, 15, and 16, which are shown in FIG. 6 are preferably implemented by microprocessor software control. This software control is described below, with reference made to relevant flowcharts.

Figure 9A:
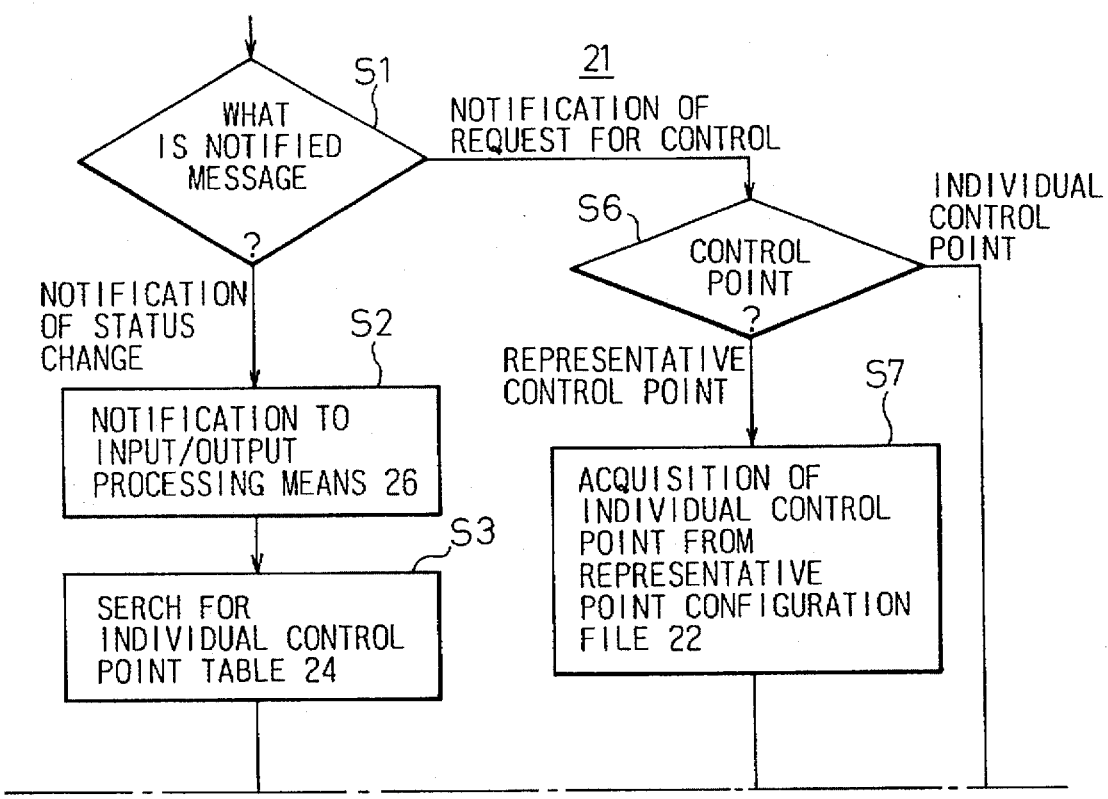
FIGS. 9A and 9B are part 1 of a flowchart which shows the operation of the status change processing means 21.
Figure 9B:
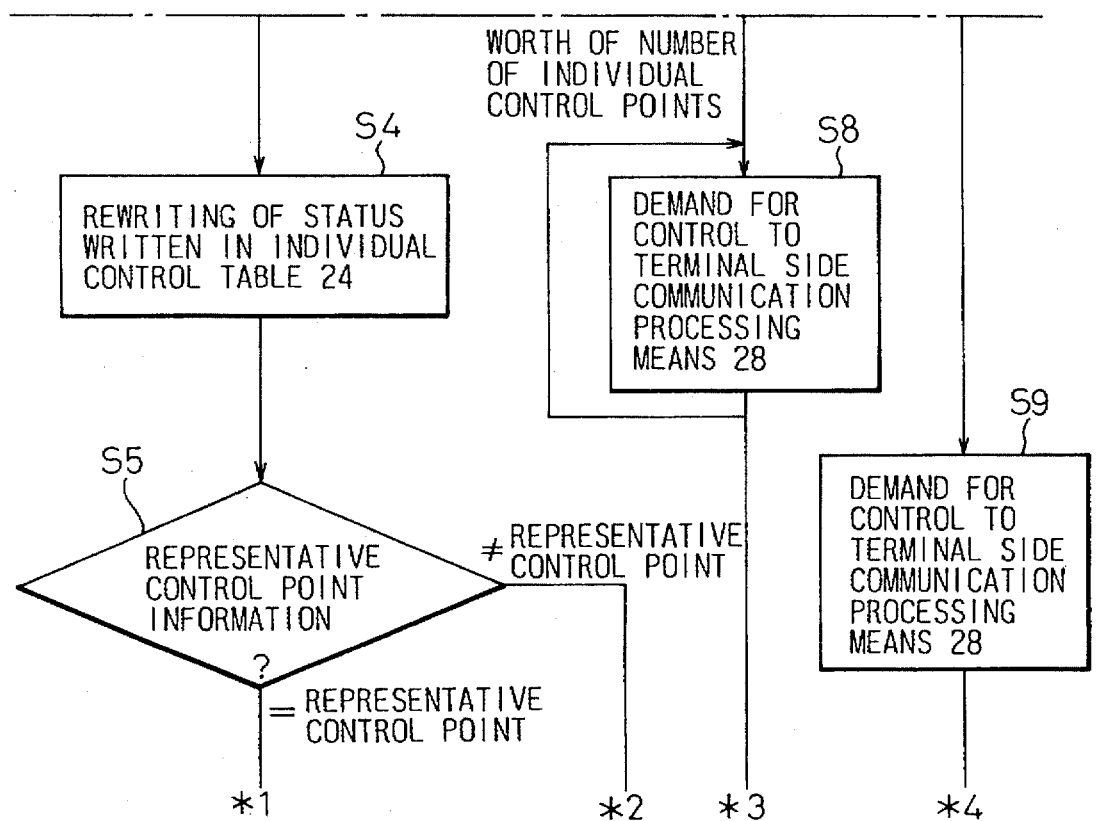
Figure 10:
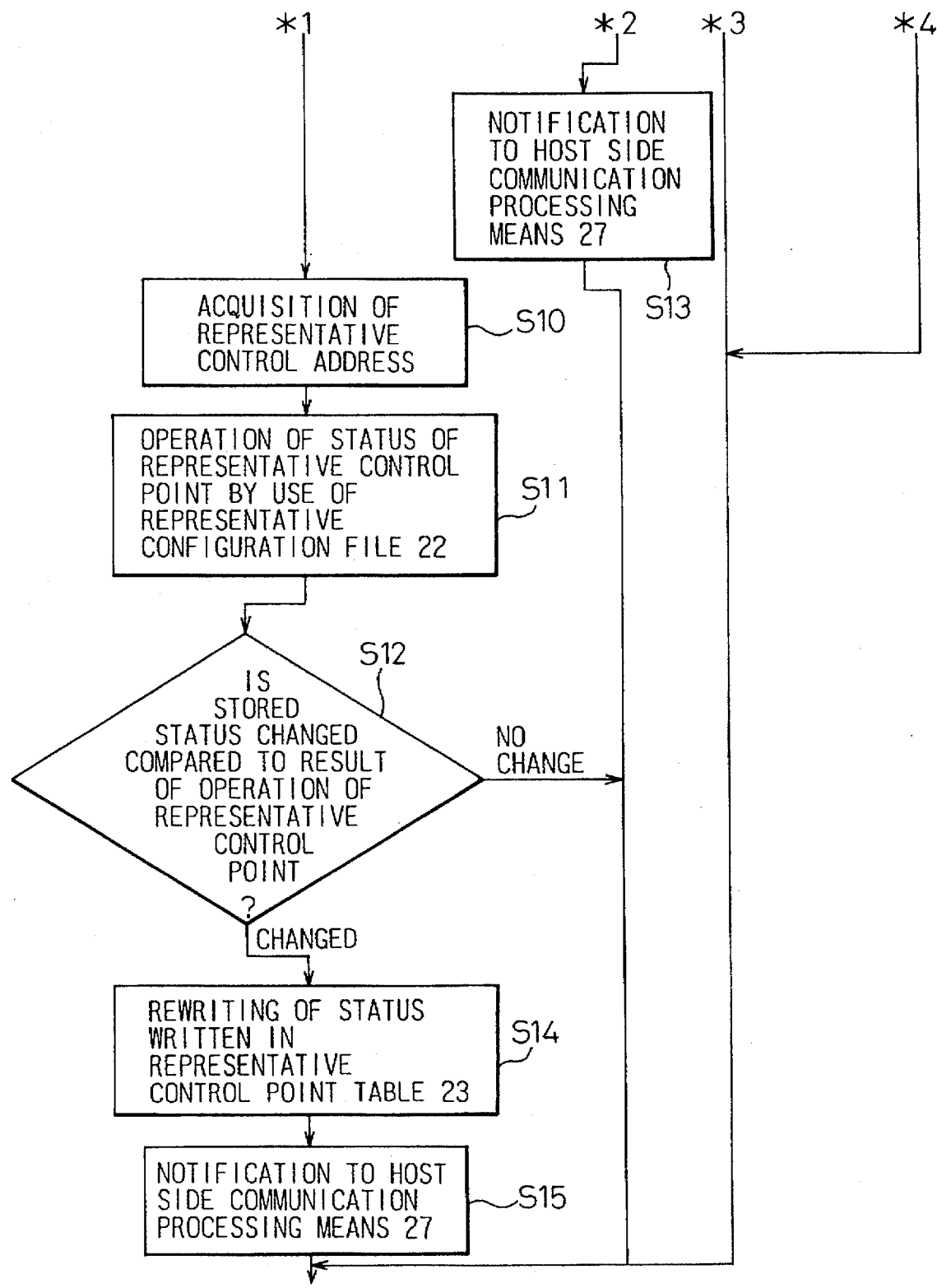
FIG. 10 is part 2 of a flowchart which shows the operation of the status change processing means 21.

FIGS. 9A and 9B are part 1 of a flowchart which shows the operation of the status change processing means 21, and FIG. 10 is second part of a flowchart which shows the operation of the status change processing means 21.

The operations performed at the various steps are as follows.

Step S1 (FIG. 9A): A judgment is performed as to whether there is a notification of a status change from the slave system 2 side or a control request with respect to the individual control point 4 from the master system 1. If the former, flow proceeds to step S2, and if the latter, flow proceeds to step S6.

Step S2: In the case of a status change, notification thereof is made to the input/output processing means 26.

Step S3: Perform a search in the individual control point table 24.

Step S4 (FIG. 9B): Overwrite the status within the individual control point table 24.

Step S5: Make a judgment as to whether or not this is a representative control point.

Step S6 (FIG. 9A): If the results of Step S1 indicate a control request from the master system 1 to a control point, determine the type of control point.

Step S7: If it is a representative control point, an acquisition of the individual control points from the representative point configuration file 22 is made.

Step S8 (FIG. 9B): Make a control request to the terminal-side communication processing means 28, for that number of individual control points.

Step S9: If the results of the type determination at step S6 was individual control point, perform a control request to the terminal-side communication processing means 28.

Step S10 (FIG. 10): If the results of the determination at step S5 are representative control point, an acquisition of the representative control point address is made.

Step S11: Use the representative point configuration file 22, and perform the operation on the status of the representative control point.

Step S12: Test whether the calculation results obtained for the representative control point are changed with respect to the immediately previous status.

Step S13: If the results of the determination at step S5 are that the information is not related to a representative control point, notify the host-side communication processing means 27 of the status change as is.

Step S14: If at step S12 a change in status was detected, overwrite the status in the representative control point table 23.

Step S15: Notify the host-side communication processing means 27 of the changed representative control point status information.

Figure 11:
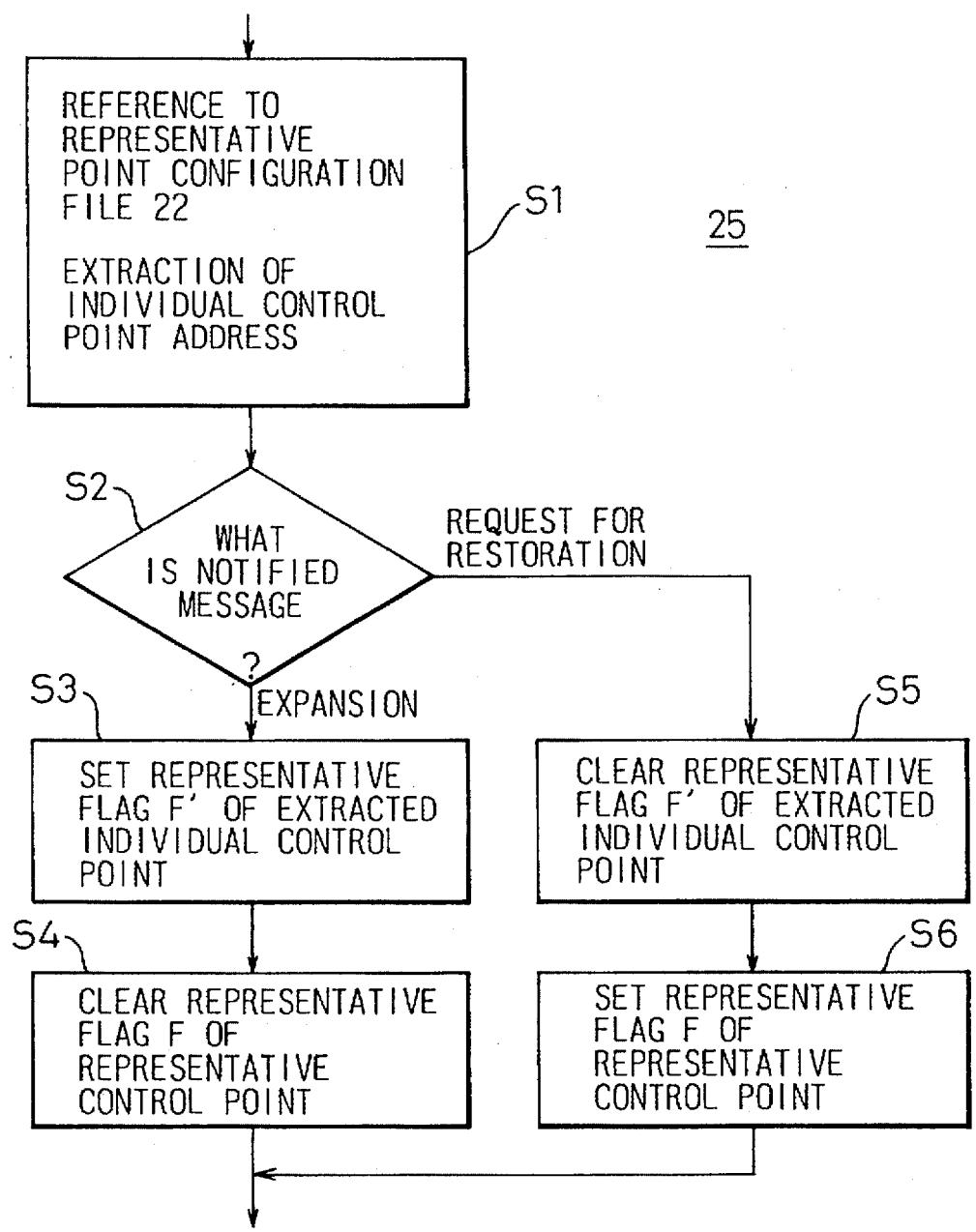
FIG. 11 is a flowchart which shows the operation of the expansion/restoration processing means 25.

FIG. 11 is a flowchart which shows the operation of the expansion/restoration processing means 25.

The operations performed at the various steps are as follows.

Step S1: When a request for either expansion or restoration is received from the master system 1, the representative point configuration file 22 is first referenced to extract the address of the individual control point.

Step S2: Examine the contents of the transferred message (request).

Step S3: If the results of step S2 are that it is an expansion request, set the representative flag F' of the extracted individual control point to "1".

Step S4: Clear the representative flag F of the representative control point to "0".

Step S5: If the results of step S2 are that it is a restoration request, clear the representative flag F' of the extracted individual control point to "0".

Step S6: Set the representative flag F of the representative control point to "1".

Figure 12:
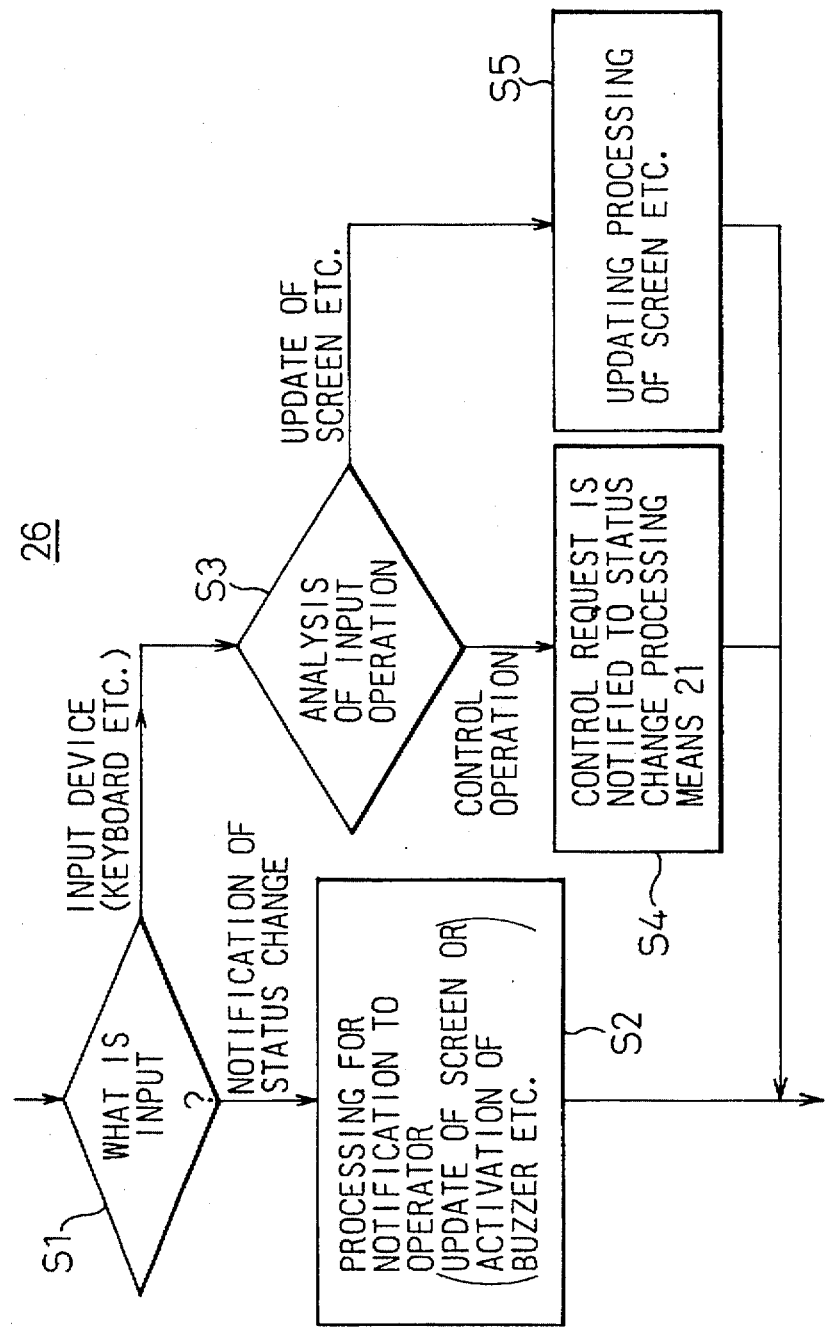
FIG. 12 is a flowchart which shows the operation of the input/output processing means 26.

FIG. 12 is a flowchart which shows the operation of the input/output processing means 26.

The operations performed at the various steps are as follows.

Step S1: Determine whether the input contents are from an input device or are a notification of a status change from an individual control point 4.

Step S2: If the results of step S1 are that it is a notification of a status change, perform processing of notification to the operator (screen update, sounding a buzzer, or the like).

Step S3: If the results of step S1 are that it is a notification from an input device, interpret the input operation, making a determination of whether it is a screen update or the like, or an operation to control an individual control point.

Step S4: If it is the latter, notify the status change processing means 21 of the control request.

Step S5: If step S3 determined that it was a screen update or the like, execute processing therefor.

Figure 13:
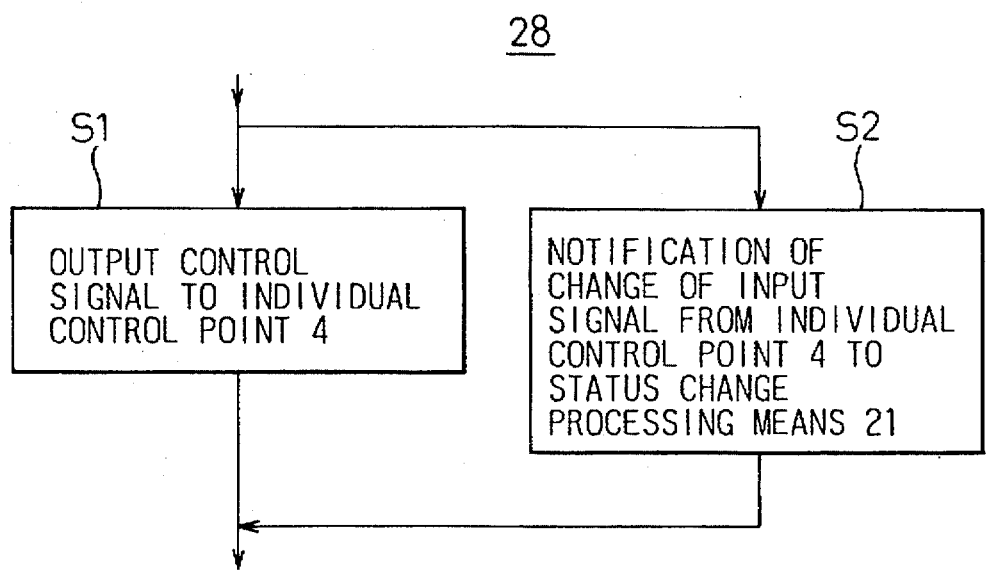
FIG. 13 is a flowchart which shows the operation of the terminal-side communication processing means 28.

FIG. 13 is a flowchart which shows the operation of the terminal-side communication processing means 28.

The operations performed at the various steps are as follows.

Step S1: Perform output of a control signal to an individual control point 4.

Step S2: Notify the status change processing means 21 of the change in the input signal from the individual control point 4.

Figure 14:
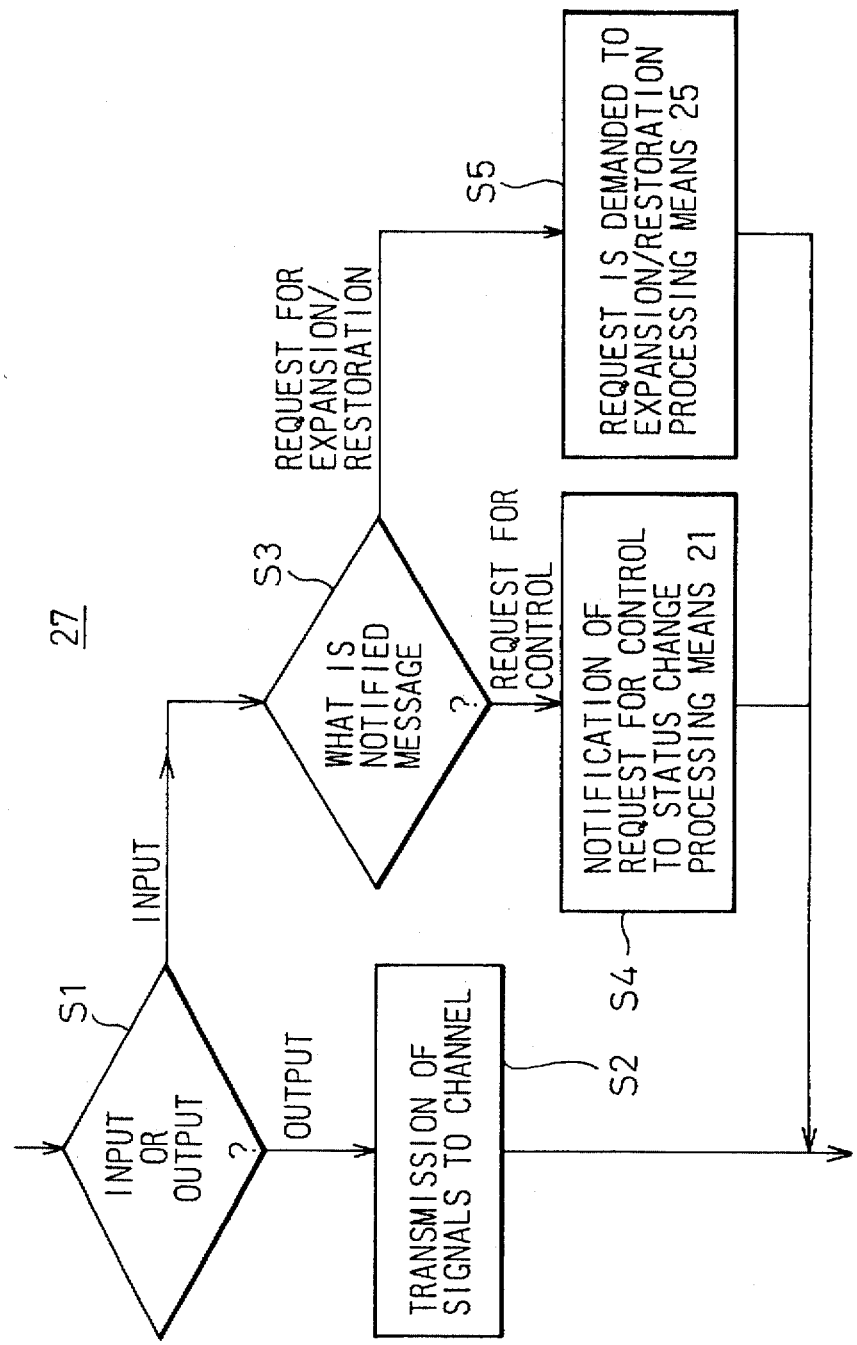
FIG. 14 is a flowchart which shows the operation of the host-side communication processing means 27.

FIG. 14 is a flowchart which shows the operation of the host-side communication processing means 27.

The operations performed at the various steps are as follows.

Step S1: Determine whether there is input from the master system 1 or output to the master system 1.

Step S2: If output, perform output of signals via the channel 3.

Step S3: If step S1 determined that there was input, test whether the input message is an expansion/restoration request or a control request.

Step S4: If it was a control request, notify the status change processing means 21 of the control request.

Step S5: If step S3 determined that it was an expansion/restoration request, make a request for that processing to the expansion/restoration processing means 25.

Figure 15:
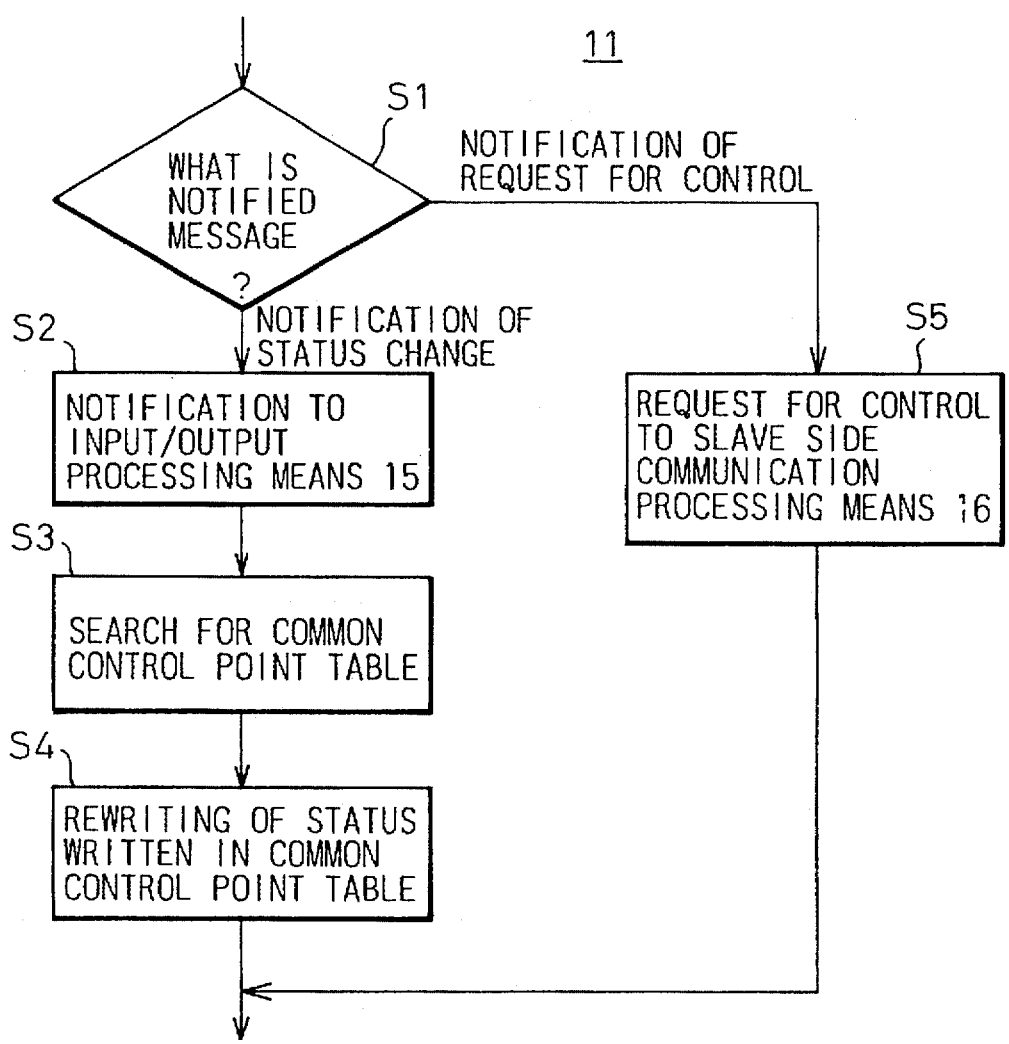
FIG. 15 is a flowchart which shows the operation of the status change processing means 11.

FIG. 15 is a flowchart which shows the operation of the status change processing means 11.

The operations performed at the various steps are as follows.

Step S1: Determine if the input contents of the message received at means 11 is a notification of a control request or a notification of status change from the slave system 2.

Step S2: If a notification of a status change, notify the input/output processing means 15 of the same.

Step S3: Perform a lookup in the common control point table 13.

Step S4: Overwrite the status in the common control point table 13, in accordance with that status change notification.

Step S5: If step S1 determines that a control request has occurred from the master system 1 to the slave system 2, transfer this control request to the slave-side communication processing means 16.

Figure 16:
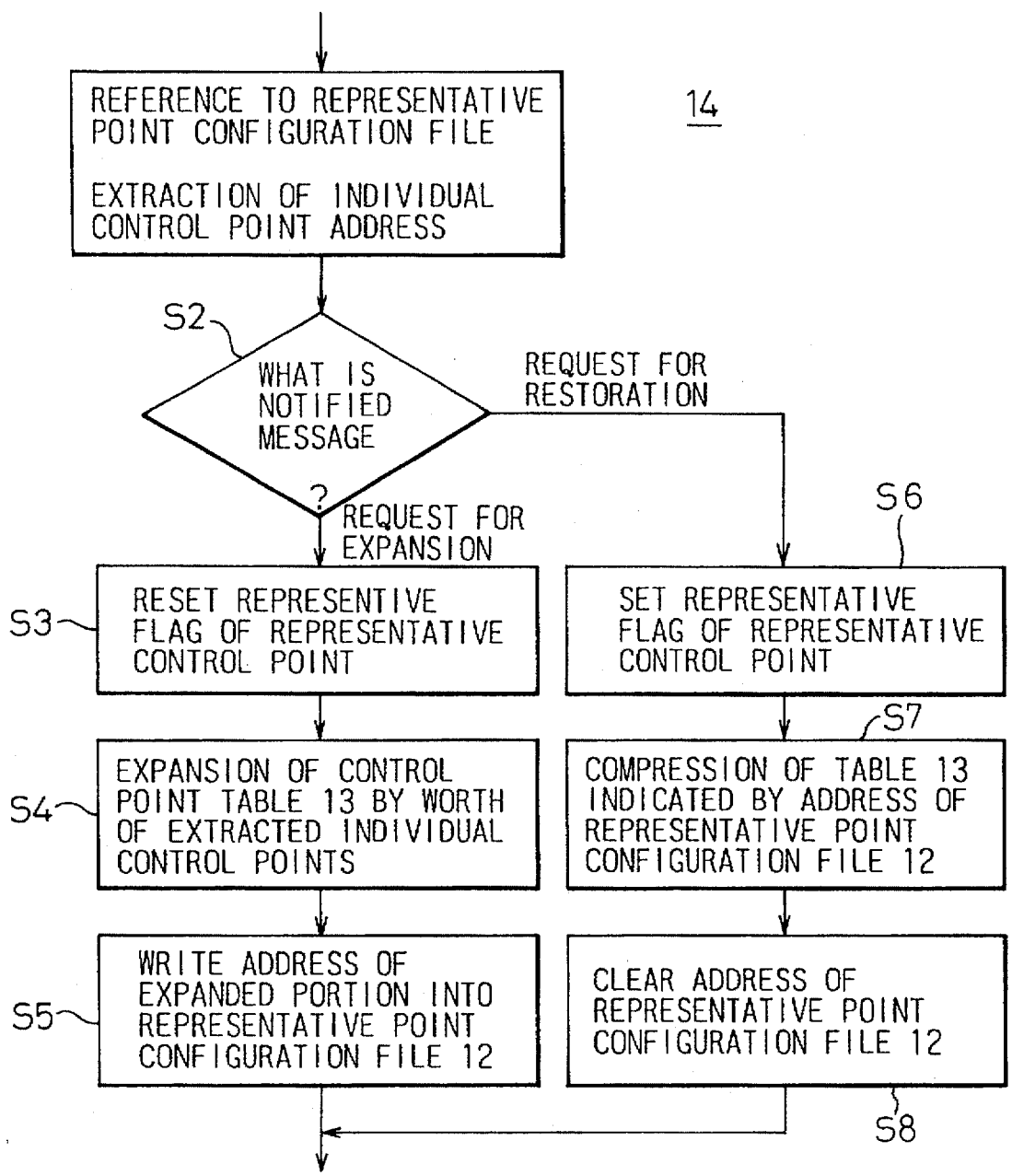
FIG. 16 is a flowchart which shows the operation of the expansion/restoration processing means 14.

FIG. 16 is a flowchart which shows the operation of the expansion/restoration processing means 14.

The operations performed at the various steps are as follows.

Step S1: When a request for expansion or restoration is received from the input/output processing means 15, first the representative point configuration file 12 is referenced, and the individual control point address is extracted.

Step S2: A determination is made as to whether the contents of the received notification message are a restoration request or an expansion request.

Step S3: If determination is made that the request is an expansion request, clear the representative flag of the representative control point to "0".

Step S4: Expand the storage area in the control point table 13 by the number of extracted individual control points.

Step S5: Write the addresses which are newly allotted as the expansion part into the representative point configuration file 12.

Step S6: If step S2 determined that a restoration request has been issued, set the representative flag F of the representative control point to "1".

Step S7: Compress the storage area of the table 13 indicated by addresses in the representative point configuration file 12 is compressed to its original condition.

Step S8: In response to this compression (restoration), the addresses of the representative point configuration file 12 are cleared.

Figure 17:
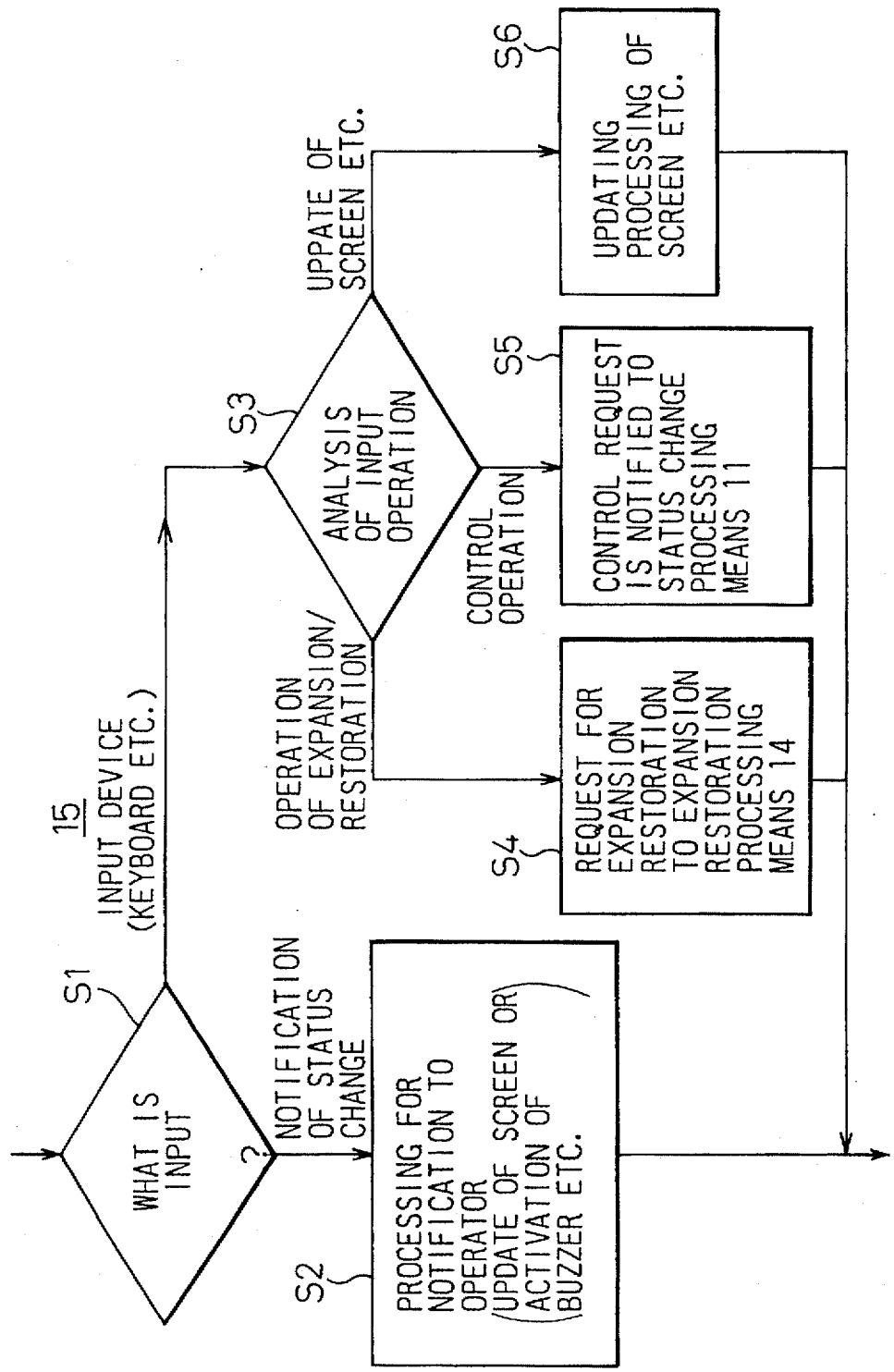
FIG. 17 is a flowchart which shows the operation of the input/output processing means 15.

FIG. 17 is a flowchart which shows the operation of the input/output processing means 15.

The operations performed at the various steps are as follows.

Step S1: A determination is made as to whether the input contents are from an input device or a notification of a status change from the slave system 2.

Step S2: If the input is a notification of a status change, perform processing of notification to the operator (screen update, sounding a buzzer, or the like).

Step S3: If the results of step S1 are that it is a notification from an input device, interpret the input operation, making a determination of whether it is a request for expansion/ restoration, a request to control the slave system 2, or a screen update or the like, and jump to step S4, S5, or S6, respectively, depending upon the result of this determination.

Step S4: If it was an expansion/restoration operation, make an expansion/restoration request to the expansion/ restoration processing means 14.

Step S5: If it was a control operation, output the control request to the status change processing means 11.

Step S6: If it was a screen update operation or the like, perform the screen update operation or the like.

Figure 18:
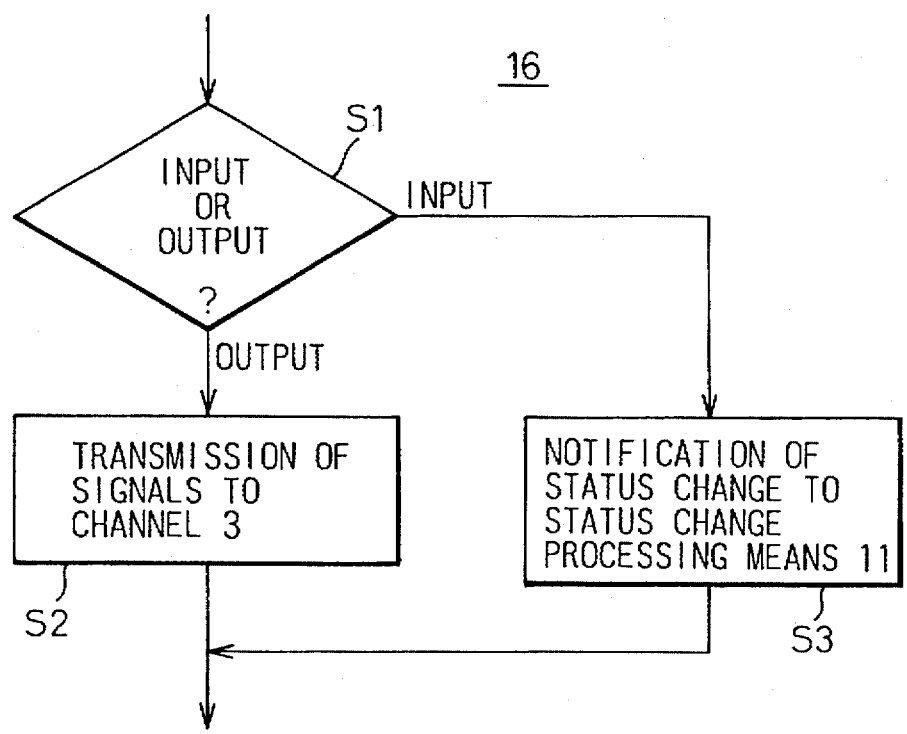
FIG. 18 is a flowchart which shows the operation of the terminal-side communication processing means 16.

FIG. 18 is a flowchart which shows the operation of the slave-side communication processing means 16.

The operations performed at the various steps are as follows.

Step S1: Determine whether there is input from a slave system 2, or output to a slave system 2, jumping to step S2 or S3, respectively, depending upon the result.

Step S2: If output, perform signal output via the channel 3.

Step S3: If input, notify the status change processing means 11 of the status change.

According to the present invention as described above, it is possible from the master system 1 to maintain almost the same type of overall individual monitoring and control capability as in the past with respect to a plurality of individual control points in the purview of a plurality of slave systems 2, while Greatly reducing the size of the memories 9 in the master system 1, which correspond to each slave systems 2.

What is claimed is:

1. A method for remote supervisory control, in which there are a plurality of slave systems, each of said slave systems having a plurality of individual control points in its purview, and performing monitoring of and control of the statuses of each of the individual control points, and a master system which is connected to each of said slave systems via channels, and which performs overall monitoring of the statuses of, or control with respect to, said plurality of individual control points of each of the slave systems, wherein:

in each said slave system said plurality of individual control points are divided beforehand into groups of individual control points having the same attribute;

a pre-established operation is performed beforehand With respect to said statuses of said plurality of individual control points of each divided group, the results of said operation being taken as the status of a representative control point which represents said group;

and further wherein by notifying said master system of the status of said representative control point, overall monitoring is performed with respect to said plurality of individual control points.

2. A method for remote supervisory control according to claim 1, wherein said master system is notified from each said slave system not only of the status of said representative control point, but also of the status of prescribed individual control points, and further wherein monitoring is performed at the master system without making distinction, with regard to the notified statuses, between a status related to said representative control point and a status related to the individual control point.

3. A method of remote supervisory control according to claim 1, wherein when notification is made from said master system of control with respect to said representative control point in one said slave system, that representative control point is restored to information with respect to said group, expansion being performed to all said individual control points which make up said group, and control is performed with respect to each expanded individual control point.

4. A method of remote supervisory control according to claim 3, wherein when said master system performs control with respect to said representative control point, and also when said master system performs control with respect to said individual control point, control is performed without making distinction, between a status related to a said representative control point and a status related to the individual control points.

5. A method of remote supervisory control according to claim 3, wherein in a part of the information related to said representative control point and said individual control point, notification of which information is given respectively from said master system to each said slave system, a flag is added which indicates whether monitoring and control are to be performed with respect to said representative control point or said individual control points, and wherein only when said flag which indicates that monitoring and control is to be performed with respect to said individual control points is set, a memory means within said master system is expanded, the statuses of each expanded said individual control point which makes up said representative control point being collected in an expanded storage area in said expanded memory means.

6. A method of remote supervisory control according to claim 5, wherein in a part of the information related to said representative control point and said individual control points, notification of which information is given from each said slave system to said master system, a flag is added which indicates whether monitoring and control are to be performed with respect to said representative control point or said individual control point, and wherein only when said flag which indicates that monitoring and control is to be performed with respect to said individual control points is set, notification is made to the master system of the statuses of each expanded said individual control point which makes up said representative control point.

7. A method of remote supervisory control according to claim 5, wherein only when the flag which indicates that monitoring and control are to be performed with respect to said representative control point is set, said expanded memory means within said master system is compressed, and monitoring and control are once again performed with respect to said representative control point.

8. A method of remote supervisory control according to claim 6, wherein only when the flag which indicates that monitoring and control are to be performed with respect to said representative control point is set, within said slave system including said representative control point restoration is made to said monitoring and control with respect to said representative control point.

9. A system for remote supervisory control, comprising a plurality of slave systems, each of said slave systems having a plurality of individual control points in its purview, and performing monitoring of and control of the statuses of each of the individual control points, and a master system which is connected to each of said slave systems via channels, and which performs overall monitoring of the statuses of, or control with respect to, said plurality of individual control points of each of the slave systems, wherein each of said slave system comprises:

an individual control point table which holds information related to the statuses of each individual control point, which are collected from each said individual control point;

a representative control point table holding statuses which represent a group of a plurality of said individual control points having the same attributes;

a slave-side status change processing means which, when there is a status change in the information related to the statuses of each individual control point collected from each said individual control point, supplies that information as is to said individual control point table, and which supplies said representative control point table with said information after a pre-established operation is performed with respect to said statuses of said plurality of individual control points;

a slave-side representative point configuration file into which are minimally stored the correspondence relationship between said representative control point and said individual control points which belong to it and an arithmetic expression which defines said operation; and a slave-side expansion/restoration processing means which works in concert with said individual control point table, said representative control point table, and said slave-side representative point configuration file either to expand processing with respect to a representative control point to processing of said individual control points or to restore processing with respect to expanded individual control point to processing with respect to said representative control point.

10. A system for remote supervisory control, comprising a plurality of slave systems, each of said slave systems having a plurality of individual control points in its purview, and performing monitoring of and control of the statuses of each of the individual control points, and a master system which is connected to each of said slave systems via channels, and which performs overall monitoring of the statuses of, or control with respect to, said plurality of individual control points of each of the slave systems, wherein said master system comprises:

a common control point table holding in common both information related to a status which represents the statuses of each of a plurality of grouped individual control points which have the same attribute and information related to the status of and collected from said individual control points;

a master-side representative point configuration file into which are stored minimally both the relationship of a representative control point representing said grouped individual control points and said individual control points which belong thereto and address information which specifies dynamically expanded or compressed storage area of said common control point table;

a master-side expansion/restoration processing means which works in concert with said common control point table and a slave-side representative point configuration file either to expand processing with respect to a representative control point to processing of said individual control points or to restore processing with respect to expanded individual control points to processing with respect to said representative control point; and a master-side status change processing means which performs overwriting of said status in said common control point table each time there is a change therein, and which, in the case in which expansion of processing with respect to a representative control point to processing of said individual control points or restoration of processing with respect to expanded individual control points to processing with respect to said representative control point is to be performed, references said master-side representative point configuration file to perform the overwriting of said status.

* * * * *

UNITED STATES PATENT AND TRADEMARK OFFICE
CERTIFICATE OF CORRECTION

PATENT NO. : 5,739,760
DATED : APRIL 14, 1998
INVENTOR(S) : Satomi HATAKEYAMA

It is certified that error appears in the above-identified patent and that said Letters Patent is hereby corrected as shown below:

On the title page, item 73, delete "Fujitu" and insert --Fujitsu--.

Signed and Sealed this

Twenty-second Day of June, 1999

Attest:

Q. TODD DICKINSON

Attesting Officer

Acting Commissioner of Patents and Trademarks